US012275130B2

(12) United States Patent
Pashut

(10) Patent No.: US 12,275,130 B2
(45) Date of Patent: Apr. 15, 2025

(54) ROBOTIC FOOD PREPARATION SYSTEM

(71) Applicant: Chefee Robotics Inc., Austin, TX (US)

(72) Inventor: Assaf Pashut, San Francisco, CA (US)

(73) Assignee: Chefee Robotics Inc., Austin, TX (US)

( * ) Notice: Subject to any disclaimer, the term of this patent is extended or adjusted under 35 U.S.C. 154(b) by 0 days.

(21) Appl. No.: 18/623,925

(22) Filed: Apr. 1, 2024

(65) Prior Publication Data

US 2024/0238982 A1    Jul. 18, 2024

Related U.S. Application Data

(62) Division of application No. 18/335,870, filed on Jun. 15, 2023, now Pat. No. 11,969,878.

(60) Provisional application No. 63/368,763, filed on Jul. 18, 2022, provisional application No. 63/366,478, filed on Jun. 16, 2022.

(51) Int. Cl.
| | |
|---|---|
| *B25J 11/00* | (2006.01) |
| *A47B 77/08* | (2006.01) |
| *B25J 15/00* | (2006.01) |
| *B25J 19/02* | (2006.01) |

(52) U.S. Cl.
CPC ........... *B25J 11/0045* (2013.01); *A47B 77/08* (2013.01); *B25J 15/0033* (2013.01); *B25J 19/023* (2013.01)

(58) Field of Classification Search
CPC ... A47B 77/08; B25J 11/0045; B25J 15/0033; B25J 19/023
See application file for complete search history.

(56) References Cited

U.S. PATENT DOCUMENTS

| | | | |
|---|---|---|---|
| 11,192,258 B2 | 12/2021 | Sinnet et al. | |
| 2016/0067866 A1* | 3/2016 | Sekar | A47J 44/00 99/348 |
| 2020/0375405 A1 | 12/2020 | He | |

FOREIGN PATENT DOCUMENTS

| | | |
|---|---|---|
| CN | 207359089 U | 5/2018 |
| IN | 202111026245 | 6/2021 |

OTHER PUBLICATIONS

International Search Report and Written Opinion received in Application No. PCT/US2023/068610, dated Sep. 29, 2023.

* cited by examiner

*Primary Examiner* — Saul Rodriguez
*Assistant Examiner* — Brendan P Tighe
(74) *Attorney, Agent, or Firm* — Perkins Coie LLP

(57) ABSTRACT

A robotic system for food preparation has a compact form factor and enables processes for dispensing food ingredients, weighing ingredients, processing ingredients, and storing and transferring ingredients in a tight space, such as within a kitchen cabinet or similar enclosure. The robotic system can also be put to use in larger commercial settings. The robotic system includes one or more gantry subsystems to translate and rotate tools relative to orthogonal axes. An ingredient storage subsystem includes multiple ingredient storage containers, each having a dispenser actuatable by an ingredient dispensing mechanism. A sensor subsystem includes a camera, a temperature sensor, or a weight sensor to detect presence or absence of objects at locations within the robotic apparatus, or to determine weight of ingredients. One or more cooking appliances have lids that can be inverted to receive and weigh dispensed ingredient(s), and transfer the ingredient(s) into the cooking appliance(s).

14 Claims, 21 Drawing Sheets

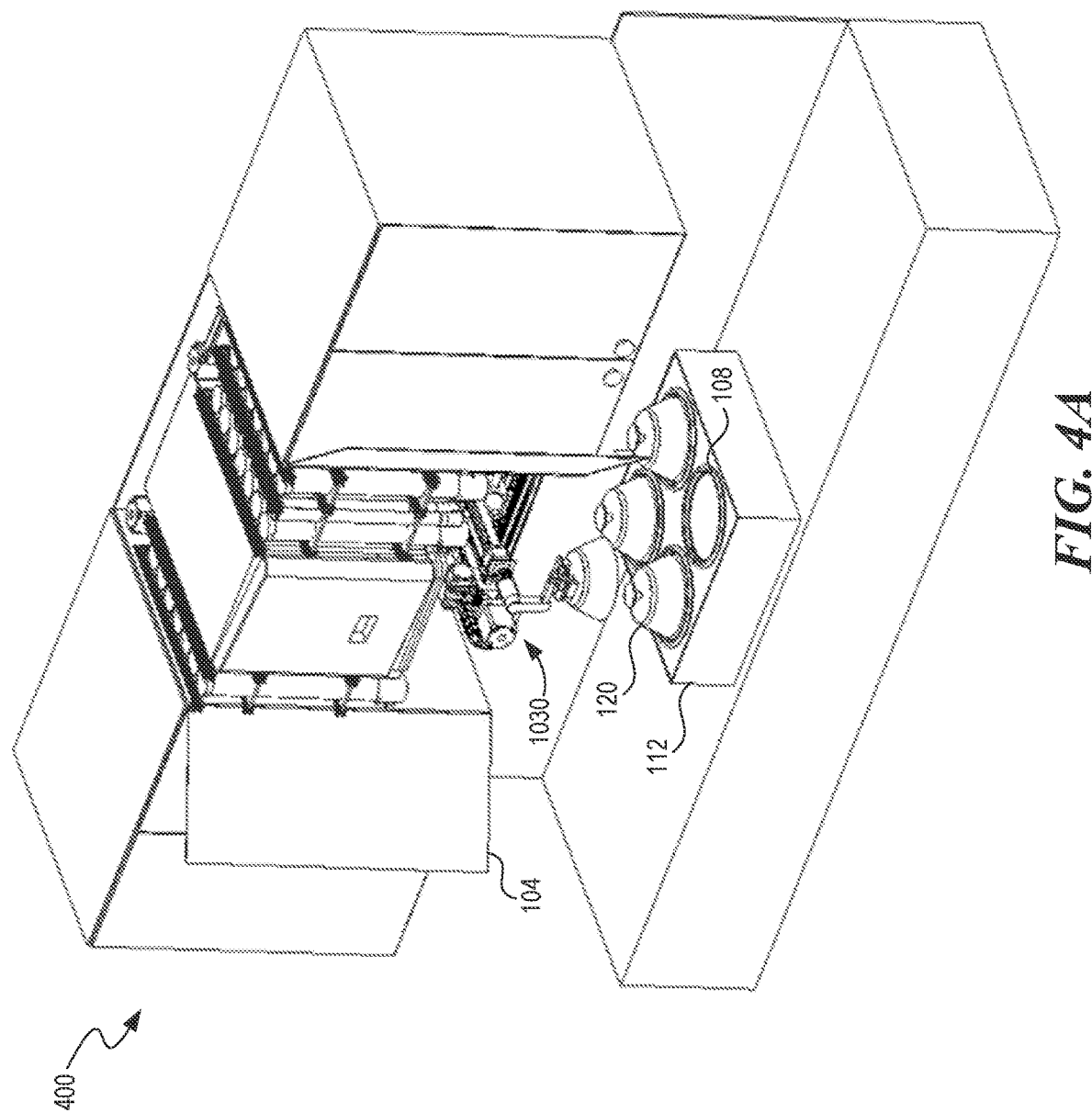

ial of U.S. patent application
ROBOTIC FOOD PREPARATION SYSTEM

CROSS-REFERENCE TO RELATED APPLICATION(S)

This application is a divisional of U.S. patent application Ser. No. 18/335,870, filed Jun. 15, 2023 and titled "ROBOTIC FOOD PREPARATION SYSTEM," which claims the benefit of U.S. Provisional Patent Application No. 63/366,478, filed Jun. 16, 2022 and titled "ROBOTIC FOOD PREPARATION SYSTEM," and U.S. Provisional Patent Application No. 63/368,763, filed Jul. 18, 2022 and titled "ROBOTIC FOOD PREPARATION SYSTEM," all of which are incorporated herein by reference in their entireties.

TECHNICAL FIELD

The embodiments described herein pertains to the field of food preparation tools and systems. More particularly, the embodiments relates to a robotic food preparation system.

BACKGROUND

There is a tremendous demand for healthy home-made foods made from scratch. However, lifestyle pressures, lack of skills or time, and other reasons often prevent people from enjoying such meals on a regular basis.

Traditional culinary techniques depend on manual labor to prepare, weigh, and combine food ingredients. These techniques often require significant training to ensure quality and accuracy, and there is a high risk of human error. More advanced systems have begun to utilize robotic arms for food preparation. These arms can grip each ingredient and serially add them to a container. Such systems have certain disadvantages, however. For example, because of their high cost of manufacturing, difficulty in programming, and bulky size, robotic arms are not only very expensive to maintain; they also require substantial infrastructure and space to install. The implementation of manual human labor is expensive, involves much potential liability, produces a relatively high error rate, and requires many hours of interviewing, training, and managing, and necessary safety measures and ample space.

BRIEF DESCRIPTION OF THE DRAWINGS

FIG. 4A is a drawing illustrating a perspective view of a robotic system for food preparation, in accordance with some embodiments.

DETAILED DESCRIPTION

Figure 1:
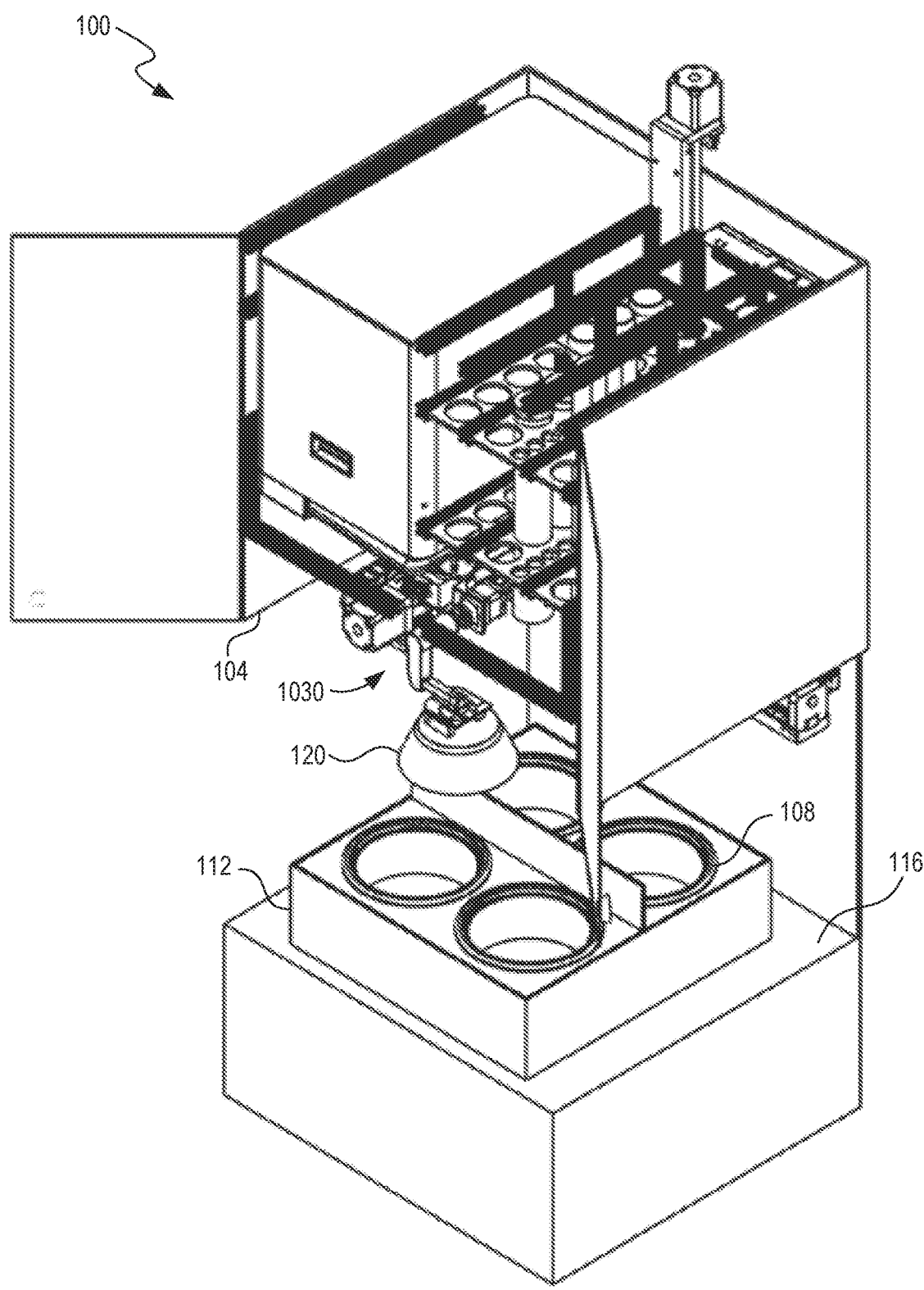
FIG. 1 is a drawing illustrating a perspective view of a robotic system for food preparation, in accordance with some embodiments.

Introduced herein are a robotic apparatus for food preparation, a robotic food preparation system, and a computer-implemented method for food preparation using a robotic food preparation system, which overcome at least some of the shortcomings mentioned above. The robotic food preparation system is a sophisticated system that can be fitted into virtually any space as small as a residential kitchen cabinet. It is relatively inexpensive to produce, straightforward to maintain, and versatile in its production ability and customization. The robotic food preparation system has a compact form factor and enables processes for dispensing ingredients, weighing ingredients, and storing and transferring ingredients in a tight space (e.g., within a kitchen cabinet or similar enclosure). Moreover, the robotic food preparation system can also be put to use in larger commercial settings.

In at least some embodiments the robotic food preparation system includes one or more gantries that have end tools, or "engagers," that align, manipulate, measure, and combine ingredients to produce finished products according to programmable recipes. Each gantry is configured to position itself at a number of angular positions about an axis for acquisition of ingredients or control of a cooking appliance. For example, a gantry is configured such that it aligns below a dispenser for each ingredient, engages with the ingredient's container to dispense the ingredient, or weighs the ingredient. A gantry can combine an ingredient with other ingredients using one or more forms of mixing or blending, or deposit the combined ingredients in an appropriate one of several available cooking appliances such as food cookers.

The robotic food preparation system can be applied to residential, commercial, gastronomical, culinary, or compound pharmaceutical industries, for example. The robotic food preparation system's structure is capable of supporting dozens of pounds of ingredients, which are accessible to a robotic gripping device by a gantry moving along multiple perpendicular axes.

In addition to physical and chemical manipulation of ingredients, the robotic food preparation system can include computer vision, backend software, or artificial intelligence (AI) to identify spills, assess food quality or shelf life, determine inventory quantities or available recipes, predict user preferences, permit recipe customization, generate shopping lists or execute the order, provide audible and/or visual user interfaces, or track the "health" or performance of the system. The system implements a variety of improved methods and systems for providing people with fresh meals and beverages (or, in another application, compound pharmaceuticals).

The disclosed motor driver can have noiseless operation, higher efficiency, and greater motor torque compared to tradition systems. The motor driver has faster current regulation and enables more dynamic motion including sensorless homing. By reducing the size and cost compared to traditional designs that use separate microprocessors, memory, and input/output devices, the disclosed systems' microcontrollers make it economical to digitally control even more devices and processes. In addition, the advantages of the convolutional neural network (CNN) used for machine learning (ML) in the disclosed embodiments include the obviation of feature extraction and the use of shared weight in convolutional layers, which means that the same filter (weights bank) is used for each node in the layer; this both reduces memory footprint and improves performance.

In at least some embodiments, the robotic food preparation system includes five major subsystems: a gantry subsystem, an ingredient storage subsystem, a sensor subsystem, a control subsystem, and a set of cookers. The gantry subsystem includes one or more robotic arms or gripper devices, and the mechanism to move them in both translation and rotation relative to three orthogonal coordinate axes (x, y, z). The ingredient storage subsystem includes multiple storage containers to store both liquid and dry food ingredients, including spices and condiments, and ingredient dispensers. The sensor subsystem includes a number of different types of sensors, such as container-fullness sensors, cameras to support computer vision, or cooker temperature sensors. The control system includes the hardware (e.g., electronics) and software to control the overall operation of the robotic food preparation system, including the other four subsystems. Various cooking appliances are provided proximate to a gantry, e.g., within a countertop box. The cooking appliances can include, for example, one or more rice cookers, crockpots, blenders, etc.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "610") can implement components, operations, or structures (e.g., "610a") described as a single instance. Further, plural instances (e.g., "610") refer collectively to a set of components, operations, or structures (e.g., "610a") described as a single instance. The description of a single component (e.g., "610a") applies equally to a like-numbered component (e.g., "610b") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

FIG. 1 is a drawing illustrating a perspective view of a robotic system 100 for food preparation, in accordance with some embodiments. Robotic system 100 is implemented using components of the example computer system 1400 illustrated and described in more detail with reference to FIG. 14. For example, a control system of robotic system 100 can be implemented on computer system 1400 using instructions 1408 programmed in main memory 1406 illustrated and described in more detail with reference to FIG. 14. Likewise, embodiments of robotic system 100 can include different and/or additional components or be connected in different ways.

At least a portion of robotic system 100 (sometimes referred to as a "robotic apparatus") is shaped and sized to be embedded within a kitchen cabinet. For example, robotic system 100 can be installed within a space that is the size of standard-sized kitchen cabinet 104 using brackets 1078 illustrated and described in more detail with reference to FIG. 10E. In some embodiments, the mechanical portion and electrical control portion (control subsystem) of robotic system 100 are installed within the space of a typical upper kitchen cabinet, while robotic system 100's cooking appliances 108 are contained within countertop box 112 that is mounted on or rests upon a standard kitchen countertop 116. For example, countertop box 112 includes four stationary cooking appliances 108 and their associated lids 120. Cooking appliances 108 can include, for example, one or more rice cookers, crockpots, blenders, and/or other similar or desired appliances.

Figure 2:
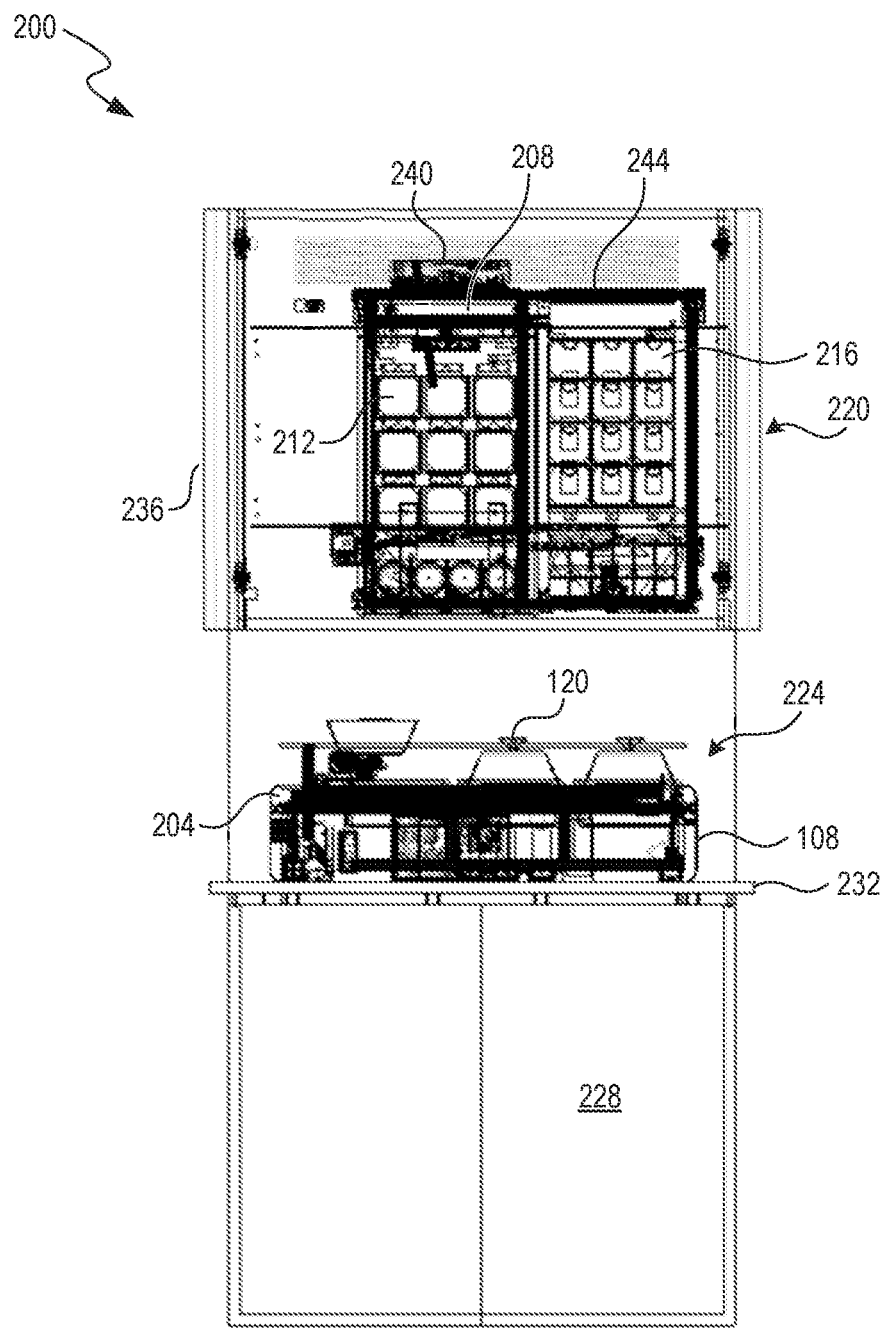
FIG. 2 is a drawing illustrating a front view of a robotic system for food preparation, in accordance with some embodiments.

FIG. 2 is a drawing illustrating a front view of a robotic system 200 for food preparation, in accordance with some embodiments. Robotic system 200 is implemented using components of the example computer system 1400 illustrated and described in more detail with reference to FIG. 14. For example, a portion of control system 204 of robotic system 200 can be implemented on computer system 1400 using instructions 1408 programmed in main memory 1406 illustrated and described in more detail with reference to FIG. 14. Likewise, embodiments of robotic system 200 can include different and/or additional components or be connected in different ways.

Robotic system 200 includes a refrigerator 208 or refrigerated section configured to contain multiple refrigerated food-grade containers 212 configured to store perishable ingredients, such as milk, cheese, fruit slices, and vegetable slices. Robotic system 200 further includes multiple non-refrigerated food-grade containers 216 configured to store non-perishable ingredients, such as seeds, nuts, oats, granola, rice, quinoa, beans, or pasta. In some embodiments, the refrigerator 208 and containers 212, 216 are part of a first unit 220 (sometimes referred to as an "upper unit") of robotic system 200 that is configured to be embedded within kitchen cabinet 236 (sometimes referred to as a "first kitchen cabinet").

The interior of kitchen cabinet 236 within which at least a part (unit 220) of robotic system 200 can be seamlessly mounted is sometimes referred to as a cabinet box or a cabinet carcass. The embedding or mounting can be performed using brackets 1078 illustrated and described in more detail with reference to FIG. 10E. Another portion (unit 224) of robotic system 200 is mounted on a base cabinet (cabinet 228), which itself is mounted on a kitchen flooring. The cabinet box includes the back, sides, top and bottom. The front of the cabinet box is used to access the robotic system 200 if needed. A cabinet door rests over this opening. For example, refrigerator 208 and food-grade containers 212, 216 are shaped and sized to be positioned within kitchen cabinet 236. Cooking appliance 108 can thus be positioned below an ingredient storage subsystem located within kitchen cabinet 236. An example ingredient storage subsystem 800 is illustrated and described in more detail with reference to FIG. 8.

Robotic system 200 includes one or more cooking appliances 108 spaced from the food-grade containers 212, 216. Cooking appliances 108 are illustrated and described in more detail with reference to FIG. 1. In some embodiments, cooking appliances 108 and control system 204 are part of a second unit 224 (sometimes referred to as a "lower unit") of robotic system 200 that is configured to be embedded within kitchen cabinet 228 (sometimes referred to as a "second kitchen cabinet"). For example, cooking appliance 108 is shaped and sized to be positioned on top of kitchen cabinet 228, which is spaced from kitchen cabinet 236. Lower unit 224 is mounted on countertop 232. Cooking appliance 108 has a lid 120 operable by a gripper device of robotic system 200. Lid 120 is configured to weigh ingredients dispensed by upper unit 220 and transfer the dispensed ingredients into cooking appliance 108. Cooking appliance 108 is configured to convert the ingredients into food for consumption.

Refrigerator 208 can be cooled using Peltier device 240 and a water block embedded within kitchen cabinet 236. Peltier device 240 (sometimes referred to as a Peltier cooler, solid state refrigerator, thermoelectric cooler (TEC), or thermoelectric heat pump) is a solid-state active heat pump that transfers heat from one side of the device to the other, with consumption of electrical energy, depending on the direction of the current. A water block is the water-cooling equivalent of a heatsink. It is a type of plate heat exchanger and can be used on many different components, including on central processing units (CPUs).

In some embodiments, refrigerator 208 includes a mini compressor system to circulate a refrigerant and maintain the temperature of a specific area. For example, a circulating refrigerant such as R134a enters the mini compressor as lower-pressure vapor at or slightly below the temperature of the interior of refrigerator 208. The vapor is compressed and exits the mini compressor as higher-pressure heated vapor. The heated vapor travels under pressure through coils or tubes that make up a mini condenser; the coils or tubes can be passively cooled by exposure to air in the room. The mini condenser cools the vapor, which liquefies. As the refrigerant leaves the mini condenser, it is sent to a section of lower pressure that causes latent heat absorption. Refrigerant leaves a mini evaporator, now fully vaporized and slightly heated, and returns to the mini compressor inlet to continue the cycle.

Figure 3:
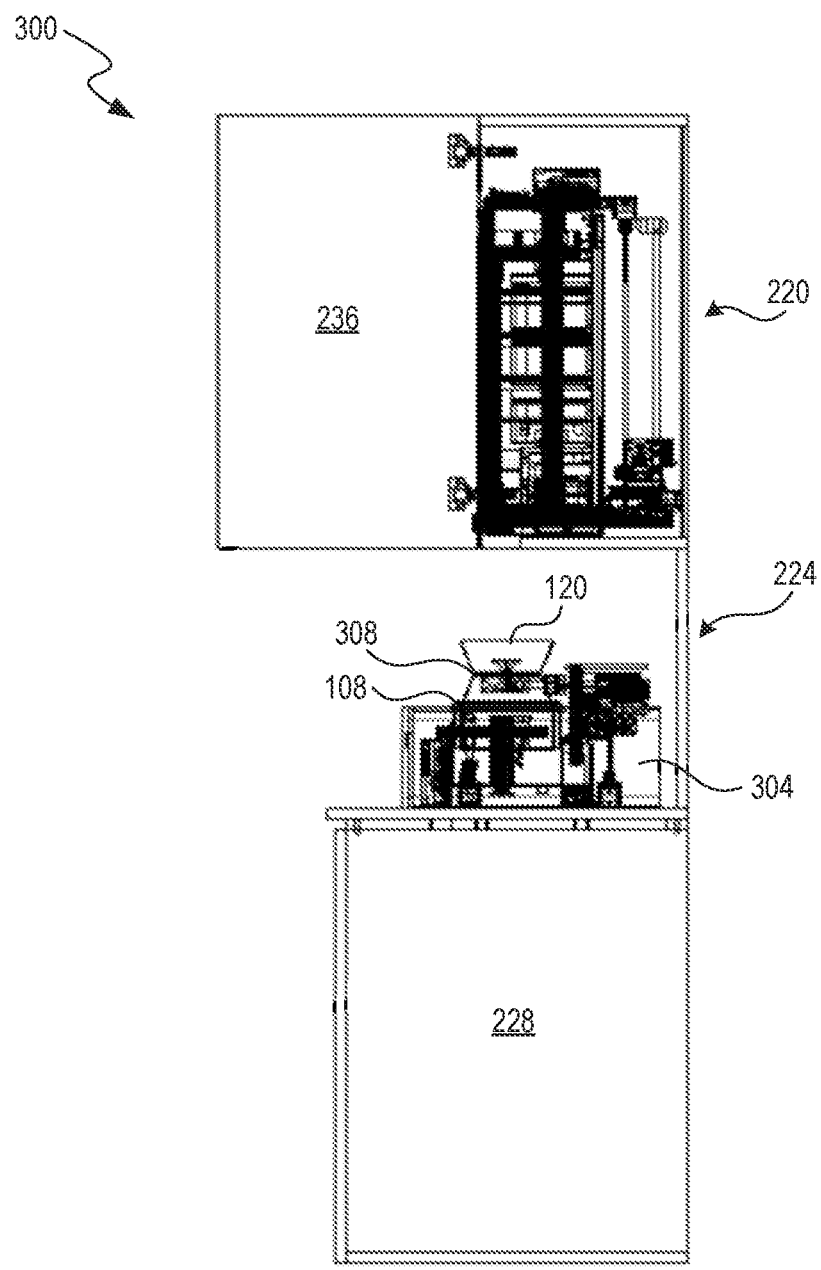
FIG. 3 is a drawing illustrating a side view of a robotic system for food preparation, in accordance with some embodiments.

FIG. 3 is a drawing illustrating a side view of a robotic system 300 for food preparation, in accordance with some embodiments. Robotic system 300 is implemented using components of the example computer system 1400 illustrated and described in more detail with reference to FIG. 14. For example, the z-axis computer numerical control (CNC) system 304 of robotic system 300 can be implemented on computer system 1400 using instructions 1408 programmed in main memory 1406 illustrated and described in more detail with reference to FIG. 14. Likewise, embodiments of robotic system 300 can include different and/or additional components or be connected in different ways.

Robotic system 300 includes first or upper unit 220 (illustrated and described in more detail with reference to FIG. 2) shaped and sized to fit within kitchen cabinet 236. Robotic system 300 further includes second or lower unit 224 (illustrated and described in more detail with reference to FIG. 2) shaped and sized to fit within kitchen cabinet 228. The z-axis CNC system 304 shown by FIG. 3 performs automated control of robotic arms and end tools, such as gripper device 308 (illustrated and described in more detail with reference to FIG. 6) or an engager device 1034 (see FIG. 10C) by means of a computer. Gripper device 308 is sometimes referred to as a gripper, gripper tool, end tool, or lid gripper. A CNC system of robotic system 300 can also control multiple motors illustrated and described in more detail with reference to FIG. 10C.

The z-axis CNC system 304 is operable using coded programmed instructions and without a manual operator directly controlling the operation. For example, the z-axis CNC system 304 and other multi-axis CNC systems (illustrated and described in more detail with reference to FIG. 6) of robotic system 300 are motorized maneuverable tools and can include a motorized maneuverable platform, which are both controlled by a computer, according to specific input instructions. Instructions are delivered to robotic system 300 in the form of a sequential program of machine control instructions, and then executed. The program can be written by a person or generated by graphical computer-aided design (CAD) software.

In some embodiments, the z-axis CNC system 304 is part of a gantry subsystem 1030 comprising a robotic arm (illustrated and described in more detail with reference to FIG. 10C). The robotic arm is mechanically coupled to gripper device 308 and an engager device 1034 (illustrated and described in more detail with reference to FIG. 10C). Gantry subsystem 1030 is configured to translate and rotate each of the robotic arm, gripper device 308, and the engager device 1034 relative to orthogonal axes 1036 (illustrated and described in more detail with reference to FIG. 10C). Cooking appliance 108 is spaced from the first unit 220 and has lid 120 operable by gripper device 308. Lid 120 is configured to be inverted by gripper device 308, receive dispensed ingredients from first unit 220, weigh the dispensed ingredients (using a weight sensor), and transfer the dispensed ingredients into cooking appliance 108. Cooking appliance 108 is configured to convert the ingredients into food.

FIG. 4A is a drawing illustrating a perspective view of a robotic system 400 for food preparation, in accordance with some embodiments. Robotic system 400 is implemented using components of the example computer system 1400 illustrated and described in more detail with reference to FIG. 14. Likewise, embodiments of robotic system 400 can include different and/or additional components or be connected in different ways.

In some embodiments, robotic system 400 includes a countertop box 112, which includes four stationary cooking appliances 108 and their associated lids 120. Cooking appliances 108 can include, for example, one or more rice cookers, crockpots, blenders, and/or other similar or desired appliances. At least a portion of robotic system 400 is configured to be embedded within kitchen cabinet 104 (see FIG. 1). Gantry subsystem 1030 provides movement and positioning of the cooking end tools, so as to enable each of the cooking end tools (described herein) to move in translation along three orthogonal coordinate axes 1036 (x, y, and z), and each of the end tools to move in rotation about at least one of the orthogonal axes (see FIG. 10C).

Figure 4B:
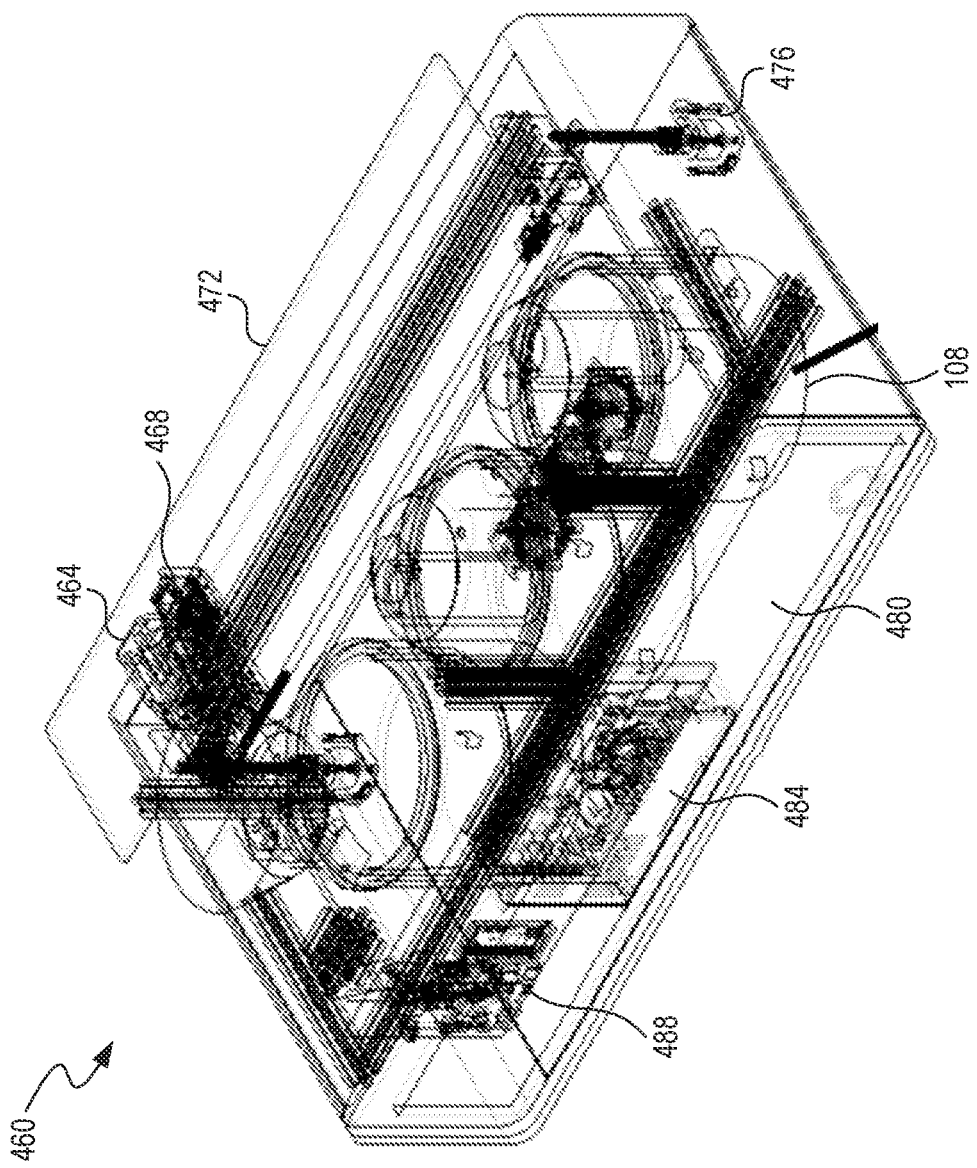
FIG. 4B is a drawing illustrating a perspective view of a unit of a robotic system for food preparation, in accordance with some embodiments.

FIG. 4B is a drawing illustrating a perspective view of a unit 460 of a robotic system for food preparation, in accordance with some embodiments. An example robotic system 200 is illustrated and described in more detail with reference to FIG. 2. Unit 460 is similar to or the same as unit 224 illustrated by FIG. 2. Unit 460 is shaped and sized to fit on a kitchen countertop (e.g., countertop 232 shown by FIG. 2). Unit 460 is implemented using components of the example computer system 1400 illustrated and described in more detail with reference to FIG. 14. Likewise, embodiments of unit 460 can include different and/or additional components or be connected in different ways.

In some embodiments, unit 460 includes motor 464 (sometimes referred to as a lid gripper motor). Motor 464 is the same as or similar to motor 1050 (sometimes referred to as "motor U") illustrated and described in more detail with reference to FIG. 10C. Unit 460 can include motor 468 (sometimes referred to as a liquid dispenser motor) used for pushing stainless steel straws of unit 460 forward to dispense liquids for the meal to cook. Unit 460 can include panel 472 (sometimes referred to as a top cover) to cover the motors 464, 464 and z-axis motor 476 from view. The z-axis motor 476 is the same as or similar to the z-motor 1048 illustrated and described in more detail with reference to FIG. 10D.

Unit 460 includes one or more cooking appliances 108 (see FIG. 2), which can be moved horizontally and vertically by the gantries illustrated and described in more detail with reference to FIGS. 10C-D. Unit 460 can include panel 480 (sometimes referred to as a front cover) to cover the interior electrical and mechanical systems of unit 460 from view. Unit 460 can include a single-board computer (SBC) 488, e.g., a Raspberry Pi 4™. Raspberry Pi is an SBC having low cost, modularity, and open design. Raspberry Pi has adopted the HDMI and USB standards.

The SBC is the main motherboard of unit 460, and has Wi-Fi and Bluetooth functionality. SBC 488 interacts with multiple components to control robotic system 200 (see FIG. 2) to execute recipes accurately. SBC 488 computes and updates online software and user interfaces in real-time to provide a smooth user experience. SBC 488 sends commands to other electronics including motors or actuators. In embodiments, SBC 488 receives input data from sensors, cloud-based software (e.g., from a website, backend database, or smart app). SBC 488 can include a system on a chip (SoC) having an integrated central processing unit (CPU) and on-chip graphics processing unit (GPU).

Figure 7:
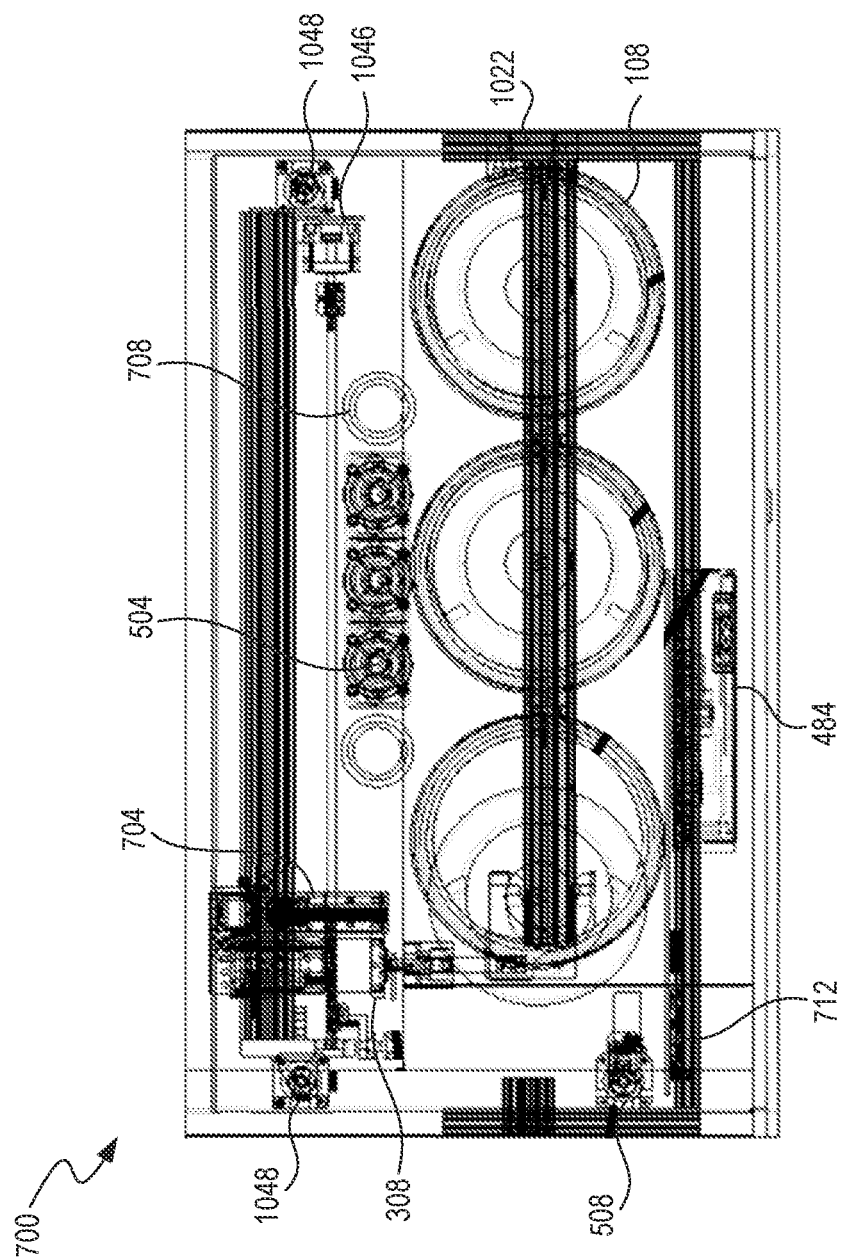
FIG. 7 is a drawing illustrating a top view of a unit of a robotic system for food preparation, in accordance with some embodiments.

Unit 460 can include a 12V power supply 484. The 12V power supply 484 (or 12 VDC power supply) produces a 12 VDC output obtained from a 120 VAC or 240 VAC input using a combination of transformers, diodes and transistors. In some embodiments, the 12V power supply 484 is a 30 amperes (A) power supply and AC-to-DC converter, providing power to all of the DC electrical components. For example, the 12V power supply 484 is connected to the relay board, peristaltic pumps, etc., as shown by FIG. 7.

Figure 5:
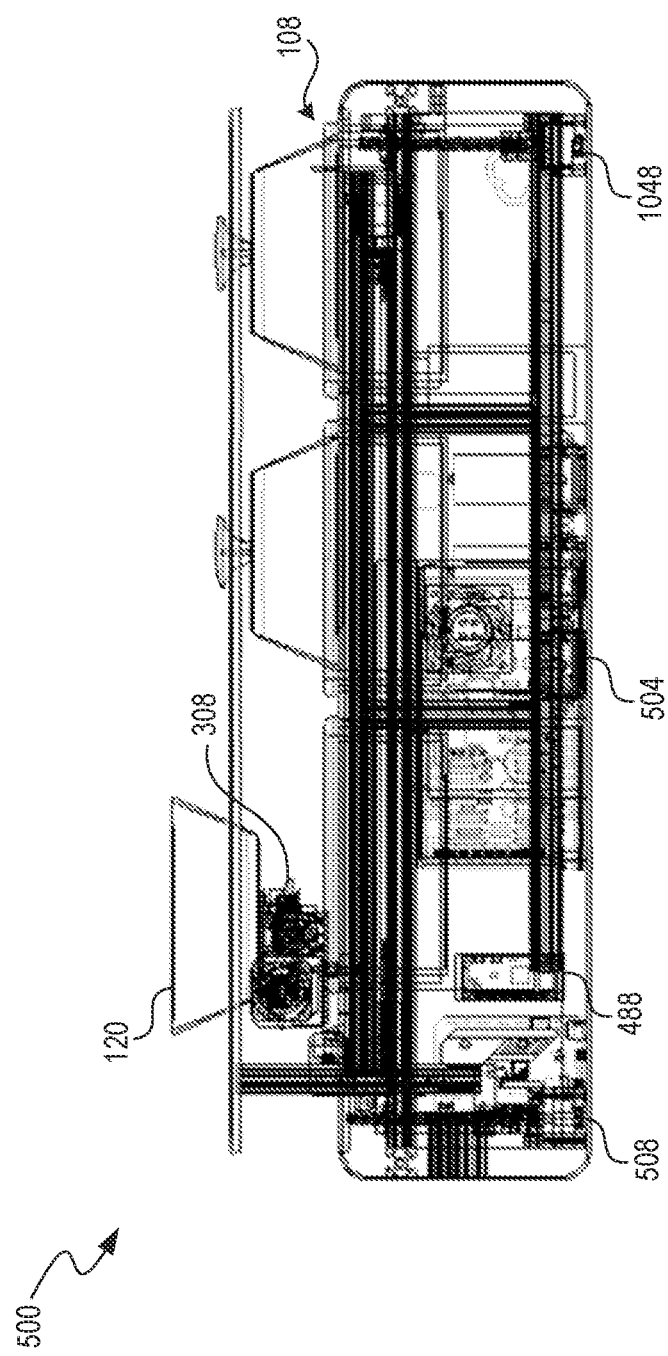
FIG. 5 is a drawing illustrating a front view of a unit of a robotic system for food preparation, in accordance with some embodiments.

FIG. 5 is a drawing illustrating a front view of a unit 500 of a robotic system for food preparation, in accordance with some embodiments. An example robotic system 200 is illustrated and described in more detail with reference to FIG. 2. Unit 500 is similar to or the same as unit 224 illustrated by FIG. 2. Unit 500 is configured to fit on a kitchen countertop (e.g., countertop 232 shown by FIG. 2). Unit 500 is implemented using components of the example computer system 1400 illustrated and described in more detail with reference to FIG. 14. Likewise, embodiments of unit 500 can include different and/or additional components or be connected in different ways.

In some embodiments, unit 500 includes cooking appliances 108, lids 120, and a lid gripper 308. Cooking appliances 108 and lids 120 are illustrated and described in more detail with reference to FIG. 1. Lid gripper 308 is illustrated and described in more detail with reference to FIG. 3. Unit 500 can include a z-axis motor 1048. The z-axis motor 1048 is illustrated and described in more detail with reference to FIGS. 10C-D. Unit 500 can include SBC 488. SBC 488 is illustrated and described in more detail with reference to FIG. 4B.

In some embodiments, unit 500 includes one or more peristaltic pumps 504. Peristaltic pump 504, also known as a roller pump, is a rotary positive displacement pump used to transport liquids without the contents coming into contact with the pump 504 components. From the pump's intake to the point of discharge, liquid flowing through a peristaltic pump only contacts the pump 504 tubing. Peristaltic pump 504 is rotatable by an engager device and/or a motor and is configured to dispense creamy ingredients from cooking appliance 108. Unit 500 can include hinge door motor 508. Hinge door motor 508 enables a robotic arm of unit 500 to enter a space within unit 500 to home itself.

Figure 6:
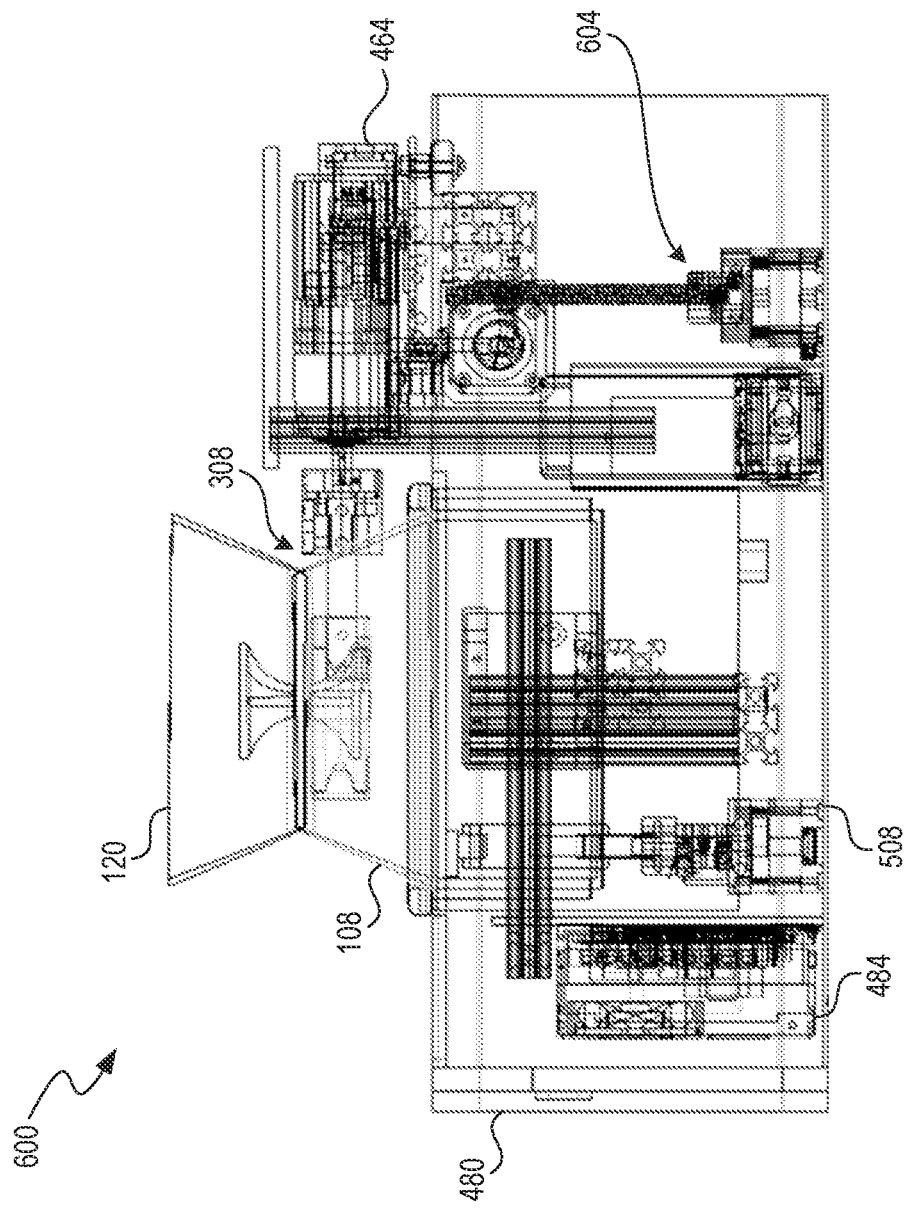
FIG. 6 is a drawing illustrating a side view of a unit of a robotic system for food preparation, in accordance with some embodiments.

FIG. 6 is a drawing illustrating a side view of a unit 600 of a robotic system for food preparation, in accordance with some embodiments. An example robotic system 200 is illustrated and described in more detail with reference to FIG. 2. Unit 600 is similar to or the same as unit 224 illustrated by FIG. 2. Unit 600 is implemented using components of the example computer system 1400 illustrated and described in more detail with reference to FIG. 14. Likewise, embodiments of unit 600 can include different and/or additional components or be connected in different ways.

In some embodiments, unit 600 includes cooking appliance 108, lid 120, and lid gripper 308. The lid 120 shown by FIG. 6 has been inverted by lid gripper 308. Cooking appliance 108 and lid 120 are illustrated and described in more detail with reference to FIG. 1. Lid gripper 308 is illustrated and described in more detail with reference to FIG. 3. Unit 600 includes a multi-axis CNC system 604. Multi-axis CNC system 604 is similar to the z-axis CNC system 304 shown by FIG. 3. However, multi-axis CNC system 604 can move a robotic arm and other tools/objects along the three orthogonal axes 1036 shown by FIG. 10C.

In some embodiments, unit 600 includes one or more lid gripper motors 464, which are the same as or similar to motor U 1050 illustrated and described in more detail with reference to FIG. 10C. Unit 500 can include hinge door motor 508 (illustrated and described in more detail with reference to FIG. 5). Hinge door motor 508 enables a robotic arm of unit 500 to enter a space within unit 600 to home itself. Unit 460 can include a 12V power supply 484 (illustrated and described in more detail with reference to FIG. 4B). In some embodiments, unit 600 includes panel 480 (sometimes referred to as a front cover or front face) to cover the interior electrical and mechanical systems of unit 600 from view.

FIG. 7 is a drawing illustrating a top view of a unit 700 of a robotic system for food preparation, in accordance with some embodiments. An example robotic system 200 is illustrated and described in more detail with reference to FIG. 2. Unit 600 is similar to or the same as unit 224 illustrated by FIG. 2. Unit 700 is implemented using components of the example computer system 1400 illustrated and described in more detail with reference to FIG. 14. Likewise, embodiments of unit 700 can include different and/or additional components or be connected in different ways.

In some embodiments, unit 700 includes liquid dispensers 704 for dispensing liquids, such as olive oil, water, soy sauce, or vinegar into cooking appliance 108 of unit 700. Unit 700 can include one or more peristaltic pumps 504, as illustrated and described in more detail with reference to FIG. 5. In some embodiments, unit 700 includes liquid vessels 708 for containing/storing liquids, such as olive oil, water, soy sauce, or vinegar in unit 700. Unit 700 can include one or more z-motors 1048, which are the same as or similar to the z-motor 1048 illustrated and described in more detail with reference to FIG. 10D. Unit 700 can include one or more x-motors 1046 to dive motion of a robotic arm or tools along the x-axis, as illustrated and described in more detail with reference to FIG. 10C. Unit 700 can include metal framework 1022 including a number of elongate aluminum extrusions to hold the various subsystems and components of unit 700 together and to mount them to the inside of a kitchen cabinet, as illustrated and described in more detail with reference to FIG. 10B.

Unit 700 includes one or more cooking appliances 108, as illustrated and described in more detail with reference to FIG. 2. Unit 460 can include a 12V power supply 484, as illustrated and described in more detail with reference to FIG. 4B, for example to drive peristaltic pumps 504. In some embodiments, unit 700 includes a microcontroller 712, such as an SKR™ microcontroller. The microcontroller 712 is a small computer on a single VLSI integrated circuit (IC) chip, and can have one or more CPUs (processor cores) along with memory and programmable input/output peripherals. Program memory in the form of ferroelectric RAM, NOR flash, or OTP ROM can be included on chip, as well as a small amount of RAM. The microcontroller 712 can be a mixed signal microcontroller, integrating analog components needed to control non-digital electronic systems. The microcontroller 712 implements a bridge between SBC 488 (see FIG. 4B) and the gantry subsystem's motors and end stops. The microcontroller 712 can relays commands from SBC 488 to the gantry subsystem 1030 (see FIG. 10C) components.

In some embodiments, unit 700 includes an 8-channel, 5V relay board to relay commands from SBC 488 to peristaltic pumps 504 and linear actuators. The 8-channel, 5V relay board or module is a LOW-level trigger relay that can be used by SBC 488 for driving higher-power electronic devices. The 8-channel, 5V relay board is used to control higher voltages with a low voltage by connecting it to microcontroller 712. The 8-channel, 5V relay board can be wired to peristaltic pumps 504 and linear actuators as well as SBC 488, providing 12V power to the former.

In some embodiments, unit 700 includes a motor driver IC for two phase stepper motors, such as a TMC2209 Stepper motor driver and electrolytic capacitor, and a 1 K ohm resistor. The motor driver enables microcontroller 712 to control six motors instead of three, and is connected to SBC 488, motors of the gantry subsystem 1030, and microcontroller 712. Unit 700 can include hinge door motor 508. Hinge door motor 508 enables a robotic arm of unit 500 to enter a space within unit 500 to home itself. Unit 700 can include 308 (illustrated and described in more detail with reference to FIG. 6).

Figure 8:
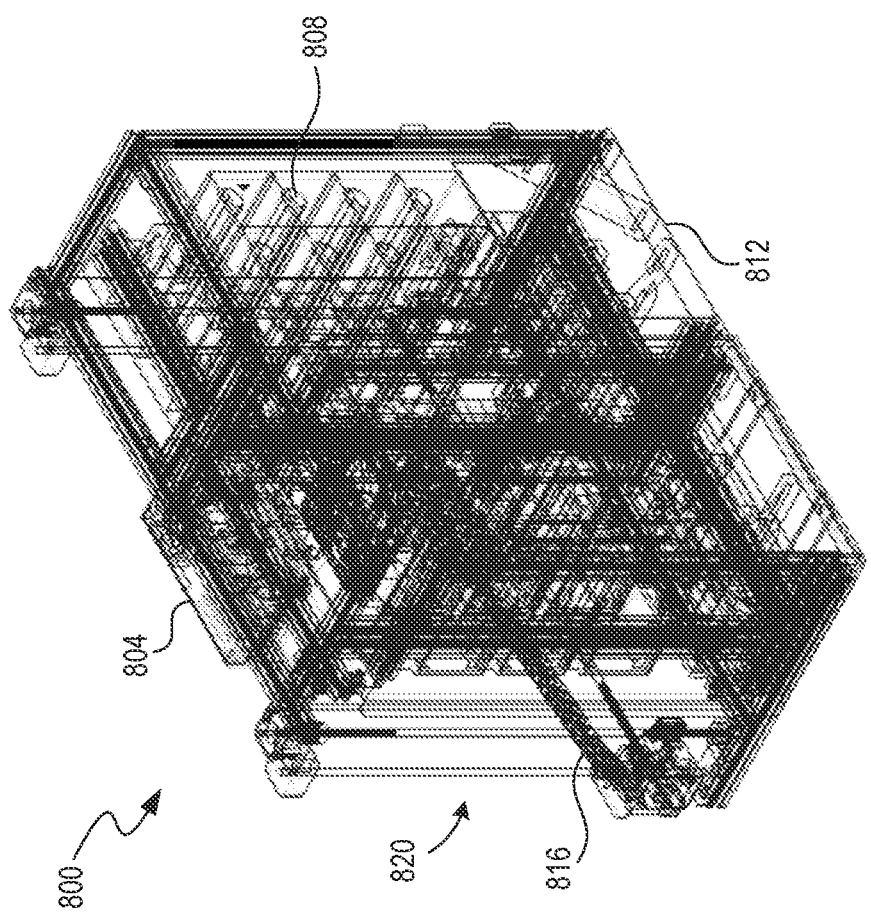
FIG. 8 is a drawing illustrating a perspective view of a portion of an ingredient storage subsystem, in accordance with some embodiments.

FIG. 8 is a drawing illustrating a perspective view of a portion of an ingredient storage subsystem 800, in accordance with some embodiments. An example robotic system 200 including ingredient storage subsystem 800 is illustrated and described in more detail with reference to FIG. 2. The ingredient storage subsystem 800 is implemented using components of the example computer system 1400 illustrated and described in more detail with reference to FIG. 14. In some embodiments, the ingredient storage subsystem 800 is shaped and sized or otherwise configured to be seamlessly embedded within kitchen cabinet 236 illustrated and described in more detail with reference to FIG. 2. Likewise, embodiments of subsystem 800 can include different and/or additional components or be connected in different ways.

The ingredient storage subsystem 800 can include a 12V power supply 804. The 12V power supply 804 is similar to the 12V power supply 484 shown by FIG. 4B. In some embodiments, ingredient storage subsystem 800 is mechanically coupled to gantry subsystem 1030 (see FIG. 10C) and includes multiple ingredient storage containers 808. Each ingredient storage container 808 has an ingredient dispenser actuatable by an ingredient dispensing mechanism operable by an engager device to dispense ingredients. An example engager device 1034 is shown by FIG. 10C. For example, ingredient storage subsystem 800 includes ingredient vessels 808 (also referred to as food-grade containers, food-grade tubes, or ingredient storage tubes herein).

In some embodiments, ingredient storage subsystem 800 includes one or more ingredient funnels 812, which are tubes or pipes that are wider at the top and narrower at the bottom for guiding certain ingredients into small openings for dispensing to the unit 224 (see FIG. 2) for food preparation. The ingredient funnels 812 can be made of stainless steel, aluminum, glass, or plastic. The ingredient storage subsystem 800 can include drag belt 816, which is similar to drag belt 1024 (see FIG. 10B) to house wires, cables and tubes to prevent coiling and tangling. Drag belt 816 can have mechanical and electrostatic properties that make conveying and handling electronic components more efficient and reliable. For example, build-up of static electricity in ingredient storage subsystem 800 can be discharged in a more controlled way. Drag belt 816 also provides low friction coefficients on the top face and underside, higher abrasion resistance and stronger, fray-free belt edges.

In some embodiments, ingredient storage subsystem 800 includes one or more multi-axis CNC systems 820. For example, the z-axis CNC system 304 and other multi-axis CNC systems (illustrated and described in more detail with reference to FIG. 6) of robotic system 300 are motorized maneuverable tools and can include a motorized maneuverable platform, which are both controlled by a computer, according to specific input instructions.

Figure 9:
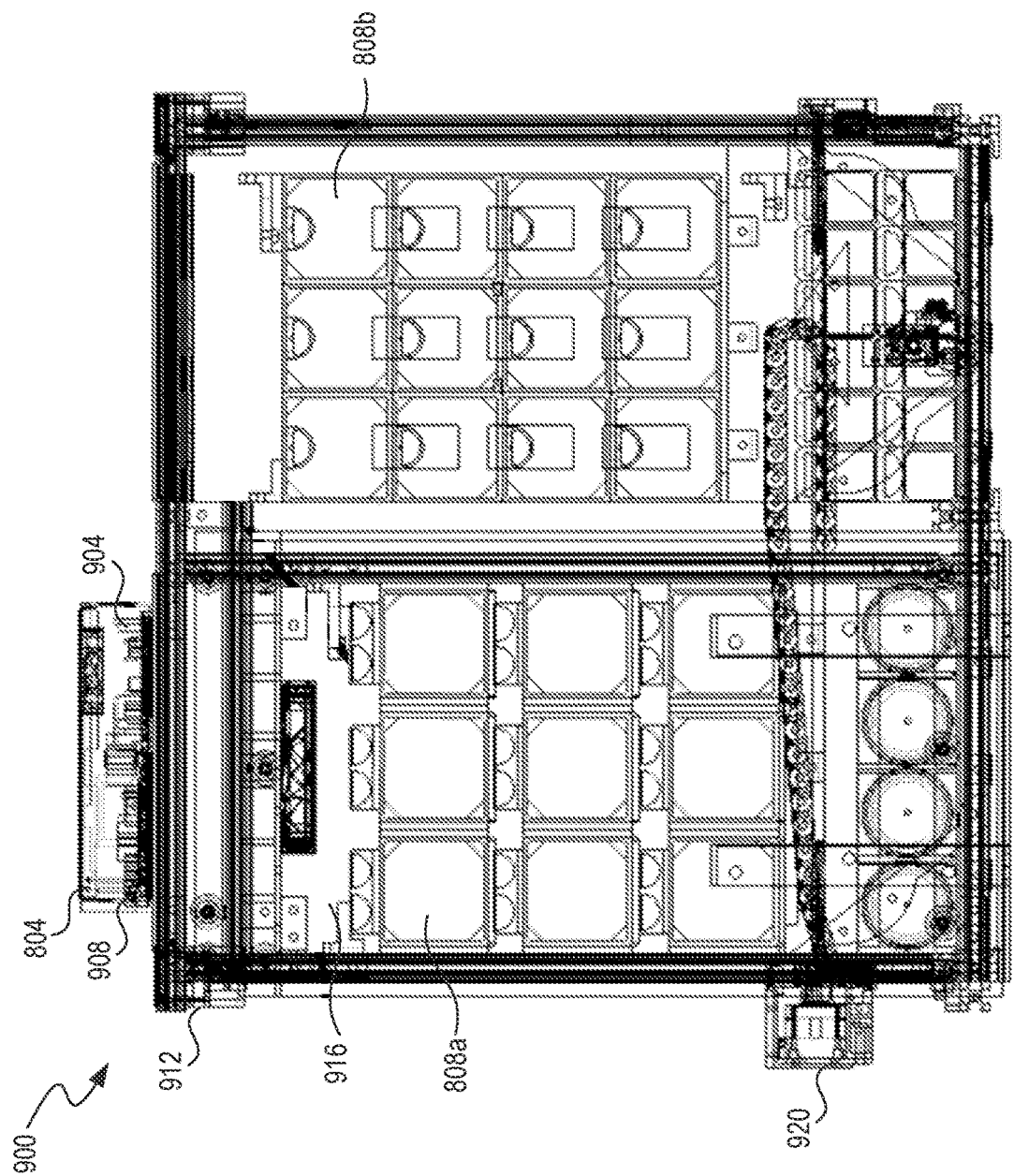
FIG. 9 is a drawing illustrating a front view of an ingredient storage subsystem, in accordance with some embodiments.

FIG. 9 is a drawing illustrating a front view of an ingredient storage subsystem 900, in accordance with some embodiments. Ingredient storage subsystem 900 is similar to or the same as ingredient storage subsystem 800 illustrated and described in more detail with reference to FIG. 8. An example robotic system 200 including ingredient storage subsystem 900 is illustrated and described in more detail with reference to FIG. 2. The ingredient storage subsystem 900 is implemented using components of the example computer system 1400 illustrated and described in more detail with reference to FIG. 14. In some embodiments, the ingredient storage subsystem 900 is shaped and sized or otherwise configured to be seamlessly embedded within kitchen cabinet 236 illustrated and described in more detail with reference to FIG. 2. Likewise, embodiments of subsystem 900 can include different and/or additional components or be connected in different ways.

The ingredient storage subsystem 900 can include a 12V power supply 804. The 12V power supply 804 is similar to the 12V power supply 484 shown by FIG. 4B. In some embodiments, ingredient storage subsystem 900 includes SBC 904. SBC 904 is similar to or the same as SBC 488 shown by FIG. 4B. The ingredient storage subsystem 900 can include multiple refrigerated ingredient storage containers 808a and/or non-refrigerated ingredient storage containers 808b. The ingredient storage containers 808 are illustrated and described in more detail with reference to FIG. 8.

In some embodiments, ingredient storage subsystem 900 includes an x-axis motor 920. The x-axis motor 920 is similar to or the same as x-motor 1046 illustrated and described in more detail with reference to FIG. 10C. For example, x-axis motor 920 can be a NEMA 17 stepper motor, which is a high-torque stepper motor that can reach speeds of up to 3000 rpm. The ingredient storage subsystem 900 can include cooling fan 916 to cool the multiple refrigerated ingredient storage containers 808a by air circulation. The ingredient storage subsystem 900 can include Peltier refrigeration plate 912, which is similar to or the same as Peltier device 240 illustrated and described in more detail with reference to FIG. 2. In some embodiments, ingredient storage subsystem 900 includes a microcontroller 908, such as an SKR™ microcontroller. Microcontroller 908 is similar to or the same as microcontroller 712 illustrated and described in more detail with reference to FIG. 7.

Figure 10A:
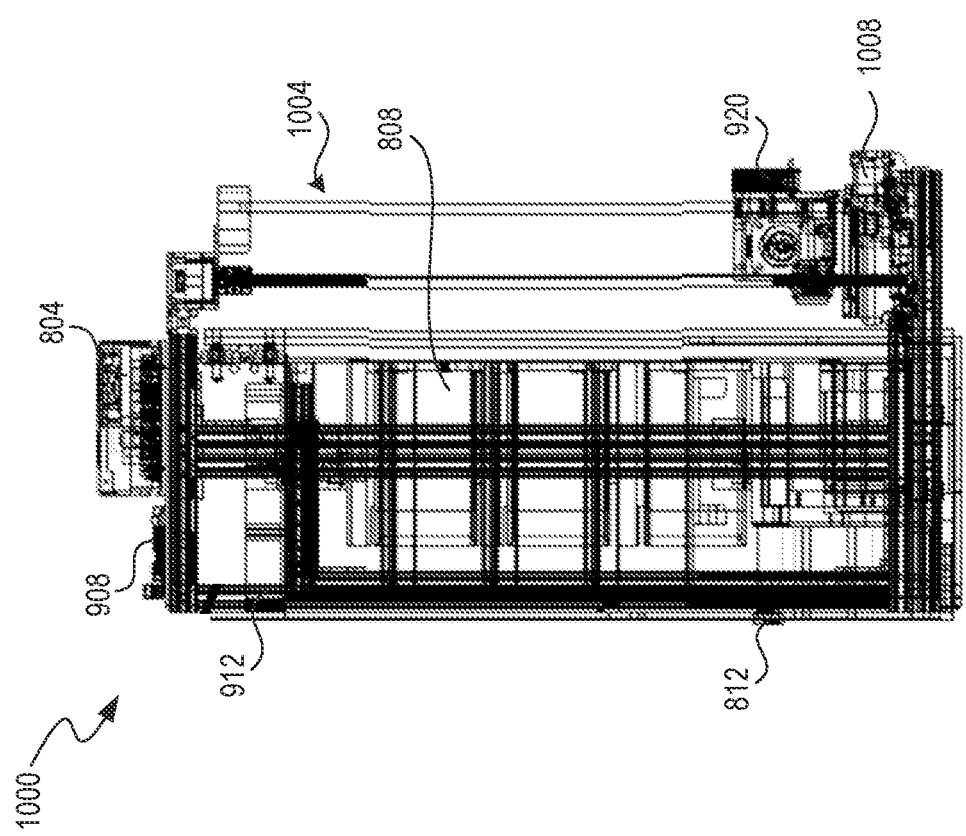
FIG. 10A is a drawing illustrating a side view of an ingredient storage subsystem, in accordance with some embodiments.

FIG. 10A is a drawing illustrating a side view of an ingredient storage subsystem 1000, in accordance with some embodiments. Ingredient storage subsystem 1000 is similar to or the same as ingredient storage subsystem 800 illustrated and described in more detail with reference to FIG. 8. An example robotic system 200 including ingredient storage subsystem 1000 is illustrated and described in more detail with reference to FIG. 2. The ingredient storage subsystem 1000 is implemented using components of the example computer system 1400 illustrated and described in more detail with reference to FIG. 14. In some embodiments, the ingredient storage subsystem 1000 is shaped and sized or otherwise configured to be seamlessly embedded within kitchen cabinet 236 illustrated and described in more detail with reference to FIG. 2. Likewise, embodiments of subsystem 1000 can include different and/or additional components or be connected in different ways.

The ingredient storage subsystem 1000 can include a 12V power supply 804. The 12V power supply 804 is similar to the 12V power supply 484 shown by FIG. 4B. In some embodiments, ingredient storage subsystem 1000 includes a multi-axis CNC system 1004, similar to the multi-axis CNC system 604 shown by FIG. 6. The ingredient storage subsystem 1000 can include multiple refrigerated and/or non-refrigerated ingredient storage containers 808, as illustrated and described in more detail with reference to FIG. 8. In some embodiments, ingredient storage subsystem 900 includes an x-axis motor 920 illustrated and described in more detail with reference to FIG. 9.

Figure 10B:
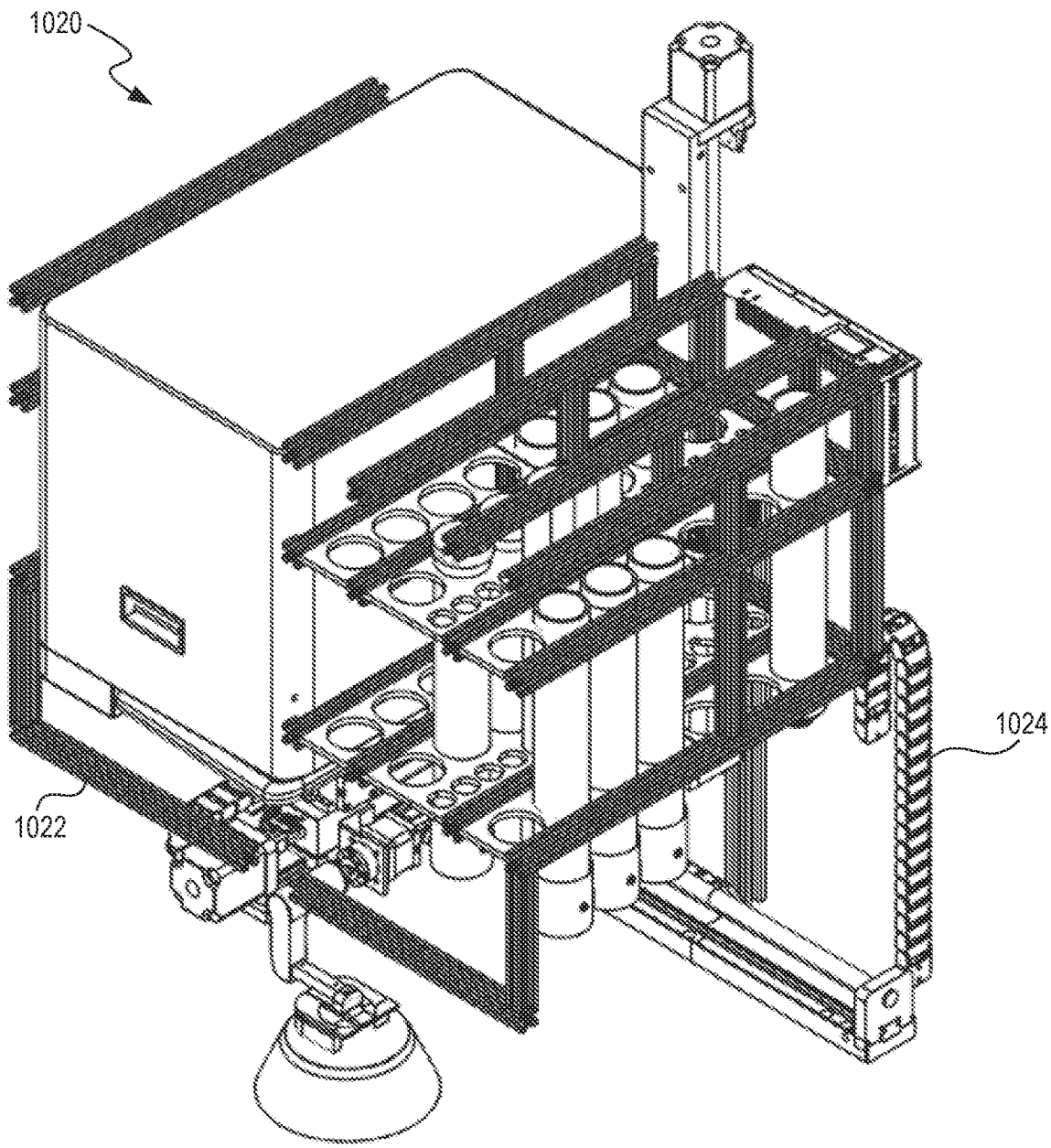
FIG. 10B is a drawing illustrating a perspective view of a robotic subsystem, in accordance with some embodiments.
Figure 10C:
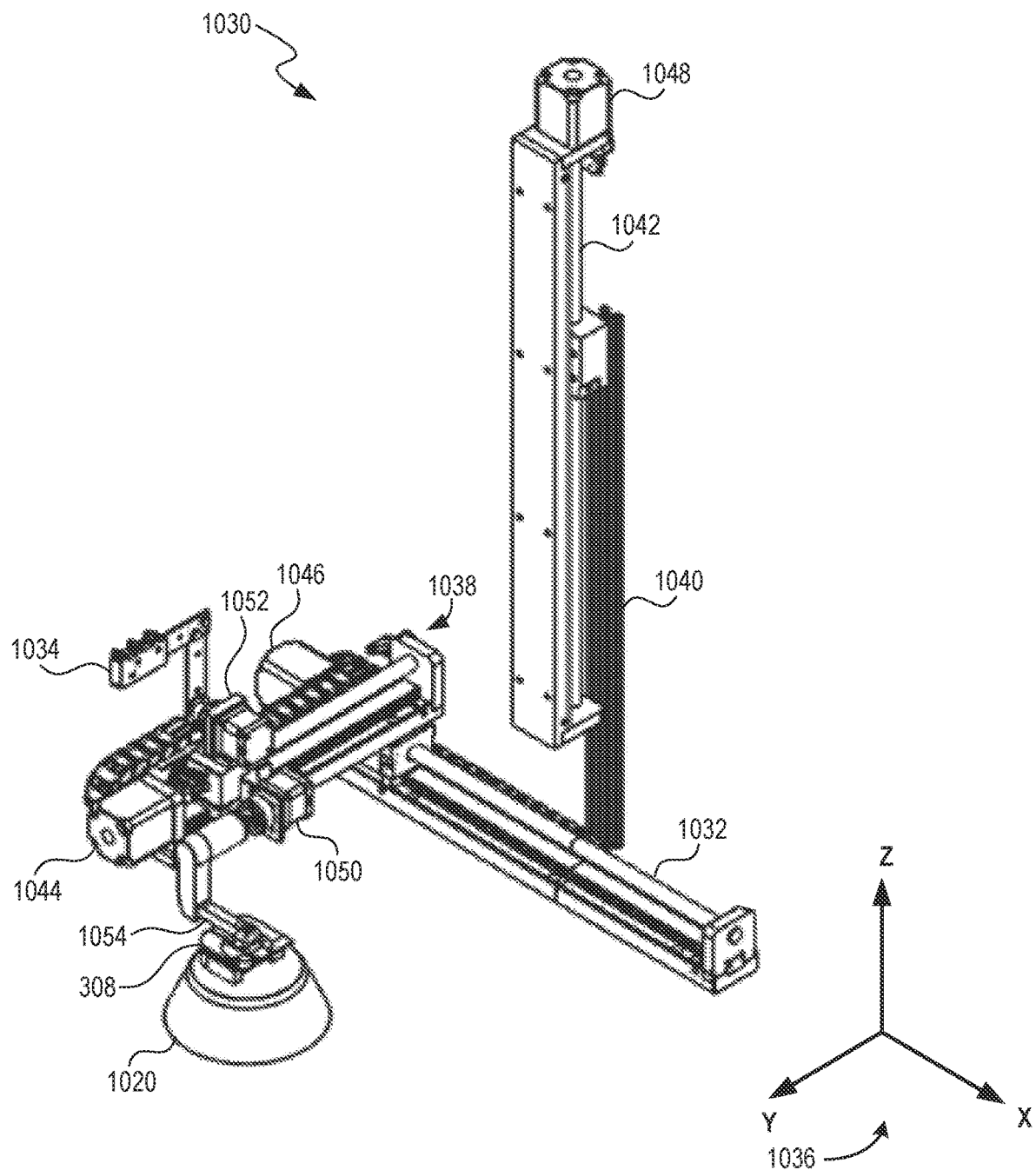
FIG. 10C is a drawing illustrating a perspective view of a gantry subsystem, in accordance with some embodiments.

The ingredient storage subsystem 1000 can include a y-axis engager device 1008 similar to the engager device 1034 shown by FIG. 10C. The y-axis engager device 1008 rotates or otherwise operates dispensing mechanisms of the ingredient storage containers 808 to dispense food ingredients as described in more detail herein. In some embodiments, ingredient storage subsystem 1000 includes one or more ingredient funnels 812 for guiding ingredients into small openings for dispensing to the unit 224 (see FIG. 2) for food preparation.

The ingredient storage subsystem 1000 can include Peltier refrigeration plate 912, which is similar to or the same as Peltier device 240 illustrated and described in more detail with reference to FIG. 2. In some embodiments, ingredient storage subsystem 1000 includes a microcontroller 908, such as an SKR™ microcontroller. Microcontroller 908 is similar to or the same as microcontroller 712 illustrated and described in more detail with reference to FIG. 7.

FIG. 10B is a drawing illustrating a perspective view of a robotic subsystem 1020, in accordance with some embodiments. Robotic subsystem 1020 is illustrated without showing the kitchen cabinets. Robotic subsystem 1020 is implemented using components of the example computer system 1400 illustrated and described in more detail with reference to FIG. 14. For example, a control system of robotic subsystem 1020 can be implemented on computer system 1400 using instructions 1408 programmed in main memory 1406 illustrated and described in more detail with reference to FIG. 14. Likewise, embodiments of robotic subsystem 1020 can include different and/or additional components or be connected in different ways.

In some embodiments, a robotic system (e.g., robotic system 200 illustrated and described in more detail with reference to FIG. 2) includes a metal framework including multiple elongate aluminum extrusions configured to support at least a portion of the robotic system, and mount the portion(s) of the robotic system to inner walls of a kitchen cabinet. For example, robotic subsystem 1020 includes metal framework 1022 including a number of elongate aluminum extrusions to hold the various subsystems and components of robotic system 200 together and to mount them to the inside of kitchen cabinet 236. Kitchen cabinet 236 is illustrated and described in more detail with reference to FIG. 2. In some embodiments, a robotic system includes at least one drag belt configured to house a wire, cable, or tube of the robotic system to prevent coiling and entangling of the wire, cable, or tube. For example, drag belt 1024 can be provided to house wires, cables and tubes to prevent coiling and tangling.

FIG. 10C is a drawing illustrating a perspective view of a gantry subsystem 1030, in accordance with some embodiments. In some embodiments, for example, as illustrated and described in more detail with reference to FIG. 2, a gantry subsystem includes two separate gantries: a first gantry for the upper unit 220 and a second gantry for the lower unit 224. Gantry subsystem 1030 is controlled using components of the example computer system 1400 illustrated and described in more detail with reference to FIG. 14. Likewise, embodiments of gantry subsystem 1030 can include different and/or additional components or be connected in different ways.

A purpose of gantry subsystem 1030 is to provide movement and positioning of cooking end tools, so as to enable each of the cooking end tools (described herein) to move in translation along three orthogonal coordinate axes 1036 (x, y, and z) and each of the end tools to move in rotation about at least one of the orthogonal axes 1036. The end tools (e.g., gripper devices 308 or engager device 1034 are designed to simulate a human hand (or hands), to engage with cooking utensils, cookware, cooking appliances, to achieve the purpose of accurately dispensing, mixing, weighing, preparing, and cooking ingredients and full programmable recipes.

In some embodiments (see FIG. 2), gantry subsystem 1030 includes a first gantry configured to reside within first kitchen cabinet 236 and operate engager device 1034 to dispense ingredients. Gantry subsystem 1030 includes a second gantry configured to reside within second kitchen cabinet 228 and position cooking appliance 108 (see FIG. 2) relative to an ingredient dispenser for cooking appliance 108 to receive dispensed ingredients.

FIG. 10C shows that the end tools include gripper device 1032 (sometimes referred to as a "lid gripper or engager") and engager device 1034 (sometimes referred to as a tube engager). The purpose of the tube engager 1034 is to dispense ingredients from food-grade containers (sometimes referred to as "ingredient container tubes"), for example by turning a spindle 1076 at the bottom of a container tube 1072 (see FIG. 10E). In some embodiments, as shown by FIG. 10E, at least some container tubes are aligned horizontally (along the x-axis and in parallel to kitchen countertop 116 of FIG. 1). In some embodiments, at least some container tubes are aligned vertically (along the z-axis and perpendicular to kitchen countertop 116 of FIG. 1). The purpose of the gripper device 308 is to grasp the lids 120 of various cooking appliances 108. The lids 120 also serve as containers for weighing and mixing ingredients.

Other embodiments of a robotic system 200 (see FIG. 2) include additional and/or different end tools, such as a slicer to slice fruits and vegetables as they are dispensed into the inverted lid 120. Robotic system 200 can include a rinser or rinsing device to rinse ingredients, such as beans or rice. The gray water from the rinsing is filtered and recycled by robotic system 200. Robotic system 200 can include a stirrer or mixer to mix ingredients together before or after they are cooked. Robotic system 200 can include a griller to stir, flip, or press ingredients on a griddle.

In some embodiments, robotic system or apparatus 200 includes a sucking device ("sucker") configured to suck in a liquid prepared by robotic apparatus 200 and transfer the liquid into cooking appliance 108 for combining the liquid with a food item prepared by robotic apparatus 200. For example, robotic system 200 can include a sucker that sucks in prepared liquids, e.g., sauces, and transfers them into a container with other ingredients (e.g., cooked pasta). This allows sauce and pasta to be prepared separately, then combined.

To move the end tools, gantry subsystem 1030 can include a mechanism similar to that used in a three-dimensional (3D) printer to move material extruders. In some embodiments, a robotic arm of gantry subsystem 1030 includes at least one elongate member oriented along an orthogonal axis (e.g., y-axis); the gripper 308 or engager device 1034 is slidably mounted on the elongate member(s). Each elongate member described herein can be made of metal (e.g., aluminum, steel, or iron), plastic, or Acrylonitrile Butadiene Styrene (ABS), an opaque thermoplastic and amorphous polymer. The gripper 308 or engager device 1034 is movable, by a motor, in translation along the orthogonal axis. For example, end tools 308, 1034 are slidably mounted on a first elongate member 1038 of gantry subsystem 1030. First elongate member 1038 is oriented so that its long dimension is along a first horizontal axis (y-axis), such that end tools 308 and 1034 are movable in translation along the y-axis.

In some embodiments, a robotic arm of gantry subsystem 1030 or robotic system 200 (see FIG. 2) includes at least a first and a second elongate member; the first elongate member is oriented along a first orthogonal axis and slidably mounted on the second elongate member. The second elongate member is oriented along a second orthogonal axis, and the first elongate member is movable in translation along the second orthogonal axis. In some embodiments, gripper device 308 or engager device 1034 is slidably mounted on the first or second elongate member; gripper device 308 or engager device 1034 is movable in translation along the first or second orthogonal axis. For example, first horizontal member 1038 is slidably mounted on second elongate member 1032, which is oriented so that its long dimension is along the second (orthogonal) horizontal axis (x-axis), such that first elongate member 1038 and tools mounted to it are movable in translation along the x-axis.

In some embodiments, second elongate member 1032 is coupled to a first end of third elongate member 1040, which is oriented to have its long dimension along the vertical axis (z-axis). A second end of third elongate member 1040 is slidably coupled to fourth elongate member 1042, which is also oriented to have its long dimension along the z-axis. This allows the entire assembly of the first elongate member 1038 and end tools 308 and 1034, second elongate member 1032, third elongate member 1040 and fourth elongate member 1042 to move together in translation along the z-axis (vertical axis).

In some embodiments, each of the first and the second elongate members, gripper device 308, and engager device 1034 is movable in translation or rotation by one or more motors. For example, translational and/or rotational motion of the above-mentioned elements is provided by multiple motors, which can be connected to the above-mentioned elements by chains, cables, and/or other suitable type(s) of linkages, or which can be directly connected to the elongate members. Motion along the y-axis is driven by y-motor 1044 (see FIG. 10D) mounted at the end of first elongate member 1038. Motion along the x-axis is driven by x-motor 1046 mounted at the end of second elongate member 1032. Motion along the z-axis is driven by z-motor 1048 mounted at the end of fourth elongate member 1042.

In some embodiments, motor U 1050 and motor 1052 (sometimes referred to as "motor V") provide rotation of the end tools 308 and 1034 about a first horizontal axis and a second horizontal axis, respectively. In at least some embodiments, horizontal bar 1054 coupled between lid gripper 308 and motor U 1050 is, or is attached to, a force sensor (not shown) so that it functions as a scale. It is used to weigh ingredients dispensed into lid 120 (see FIG. 1) when lid 120 is held inverted by lid gripper 308.

FIG. 10C illustrates some embodiments having a z-motor 1048 to provide vertical motion of the illustrated gantry. FIG. 10D illustrates some embodiments in which another, similar gantry subsystem 1060 includes two z-motors 1048 coupled respectively to two sets of elongate vertical members, to provide motion of end tools along the z-axis. Some embodiments may provide more structural stability and robustness than other embodiments.

In at least some embodiments, gantry subsystem 1030 includes at least one x-motor 1046 to actuate a gantry on the x-axis, linearly (side to side). Any one of the motors described herein can be a DC motor, a servo motor, a stepper motor, a brushed DC actuator, or a brushless DC drive. For example, x-motor 1046 can be one of six or more motors that enable alignment of a gantry with its destination, whether to an ingredient, tool, or cooking appliance 108. Gantry subsystem 1030 can include y-motor 1044 to actuate a gantry on the y-axis, linearly (front to back). The y-motor 1044 can be one of six motors that enable alignment of the gantry with its destination, whether to an ingredient, tool, or cooking appliance.

In some embodiments, gantry subsystem 1030 includes one or more z-motors 1048 to actuates a gantry on the z-axis, linearly (up and down). The z-motor 1048 is one of six motors that enable alignment of the gantry with its destination, whether to an ingredient, tool, or cooking appliance. Gantry subsystem 1030 can include one or more motors (e.g., motor U 1050) attached to a gantry's platform. Motor 1050 (sometimes referred to as "motor U") rotates a tool (e.g., gripper device 308) that is connected to motor U 1050 via an hx711 scale. The hx711 scale is a force transducer that converts a force such as tension, compression, pressure, or torque into an electrical signal that can be measured and standardized. As the force applied to the load cell increases, the electrical signal changes proportionally. The hx711 scale is connected to motor U 1050. The scale enables robotic system 200 to weigh each dispensed ingredient. In some embodiments, a rectangular bar functions as a bridge between motor U 1050 and gripper 308. An example horizontal bar 1054 (see FIG. 10C) is coupled between lid gripper 308 and motor U 1050 can be a force sensor (hx711 scale). It is used to weigh ingredients dispensed into lid 120 (see FIG. 1) when lid 120 is held inverted by lid gripper 308. The motor U 1050 is one of six motors that enable alignment of a gantry with its destination, whether to an ingredient, tool, or cooking appliance.

In some embodiments, gantry subsystem 1030 includes one or motors 1052 rotate a tool connected to a gantry. The motor 1052 (sometimes referred to as "motor V") engages with other tools to dispense each ingredient. The motor V 1052 is one of six motors that enable alignment of the gantry with its destination, whether to an ingredient, tool, or cooking appliance 108. The gantry subsystem 1030 can include gripper device 308 connected to motor U 1050. Gripper 308 grips or grasps elements such as lid 120 of cooking appliance 108. Lid 120, when inverted, doubles as a bowl on which ingredients are weighed and which carries ingredients from place to place. Gripper 308 is rotated by motor U 1050 to grip appliance lids 120 and thus carry, mix, or pour ingredients into appliance 108.

A tube engager 1034 can be connected to motor V 1052 via two metal rectangular plates. The tube engager 1034 is a tool that, when aligned, can engage with other mechanisms and tools. The tube engager 1034 physically makes contact and applies pressure to the dispensing tools of food containers, thereby dispensing food ingredients.

In some embodiments, robotic system 200 (see FIG. 2) includes a sensor subsystem including at least one of a camera, a temperature sensor, or a weight sensor. The sensor subsystem can include one or more digital cameras configured to capture images of robotic apparatus 200 as well as an area proximate to robotic apparatus 200 for performing machine vision functions. For example, a camera, which can be a stereoscopic camera, can be mounted within robotic system 200 under the gantry subsystem 1030, and may be aimed at cooking appliances 108. The digital cameras produce visual images and data for machine vision, e.g., for software to identify spills, inventory levels, and ingredient quality. The digital camera(s) also enable real-time oversight of the system 200 to ensure quality performance.

Some implementations of robotic system 200 include a light sensor configured to detect presence or absence of objects (e.g., food items, tools, or a user) at locations within robotic apparatus 200. For example, the light sensors produce on-off data (1 or 0 values) to generate data for the system 200 to identify where objects (e.g., food items) are (e.g., at predetermined locations in the system) based on whether the sensors are activated or not. In some examples, robotic system 200 includes a container fullness sensor configured to detect an amount of an ingredient within food-grade containers 800 (see FIG. 8). Implementations of robotic system 200 can also include temperature sensors, humidity sensors, carbon dioxide sensors, or smoke detectors. In some embodiments, robotic system 200 includes a mechanical end stop for a motor of robotic apparatus 200. The Mechanical end stops generate on-off data (1 and 0 values) to provide data for system 200 to self-calibrate and "sense" where objects are based on whether a sensor is activated or not.

Figure 10D:
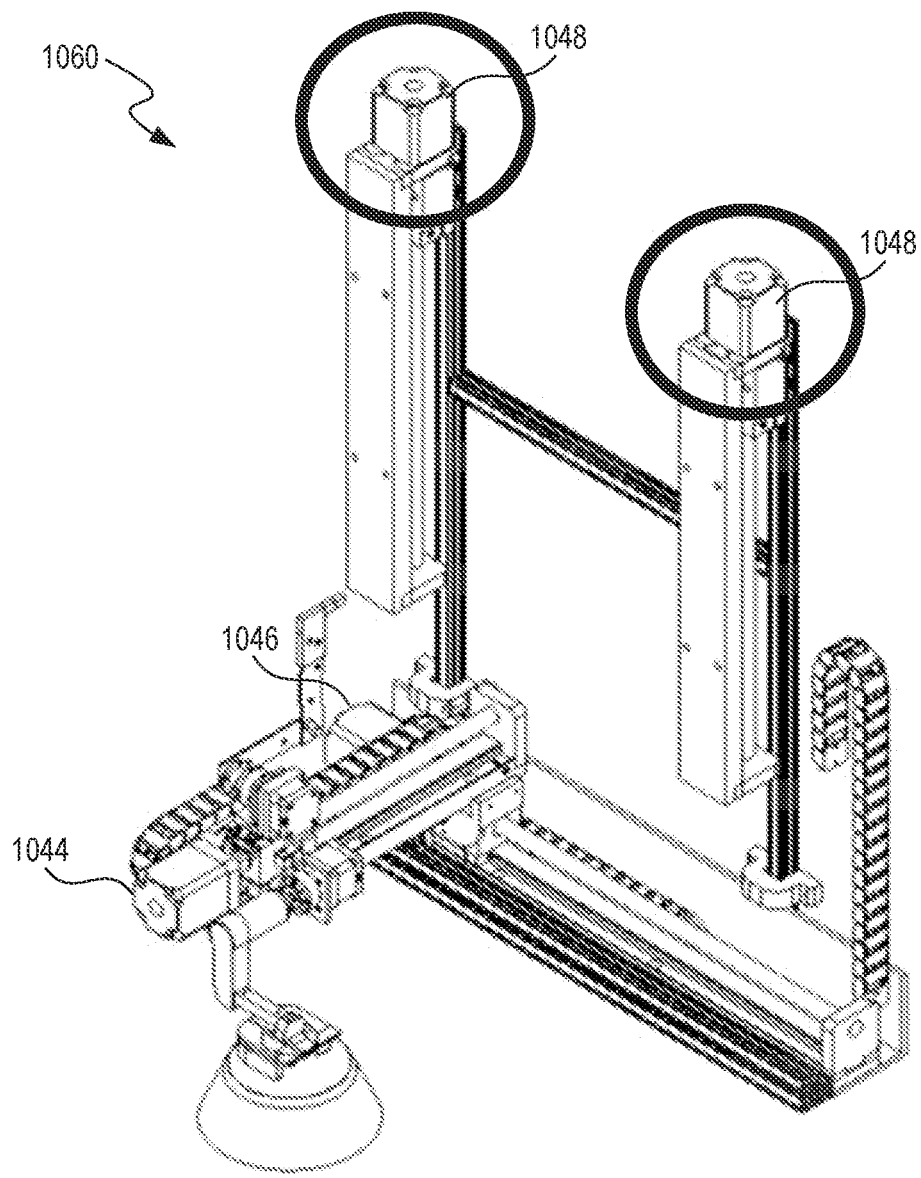
FIG. 10D is a drawing illustrating a perspective view of a gantry subsystem, in accordance with some embodiments.
Figure 10E:
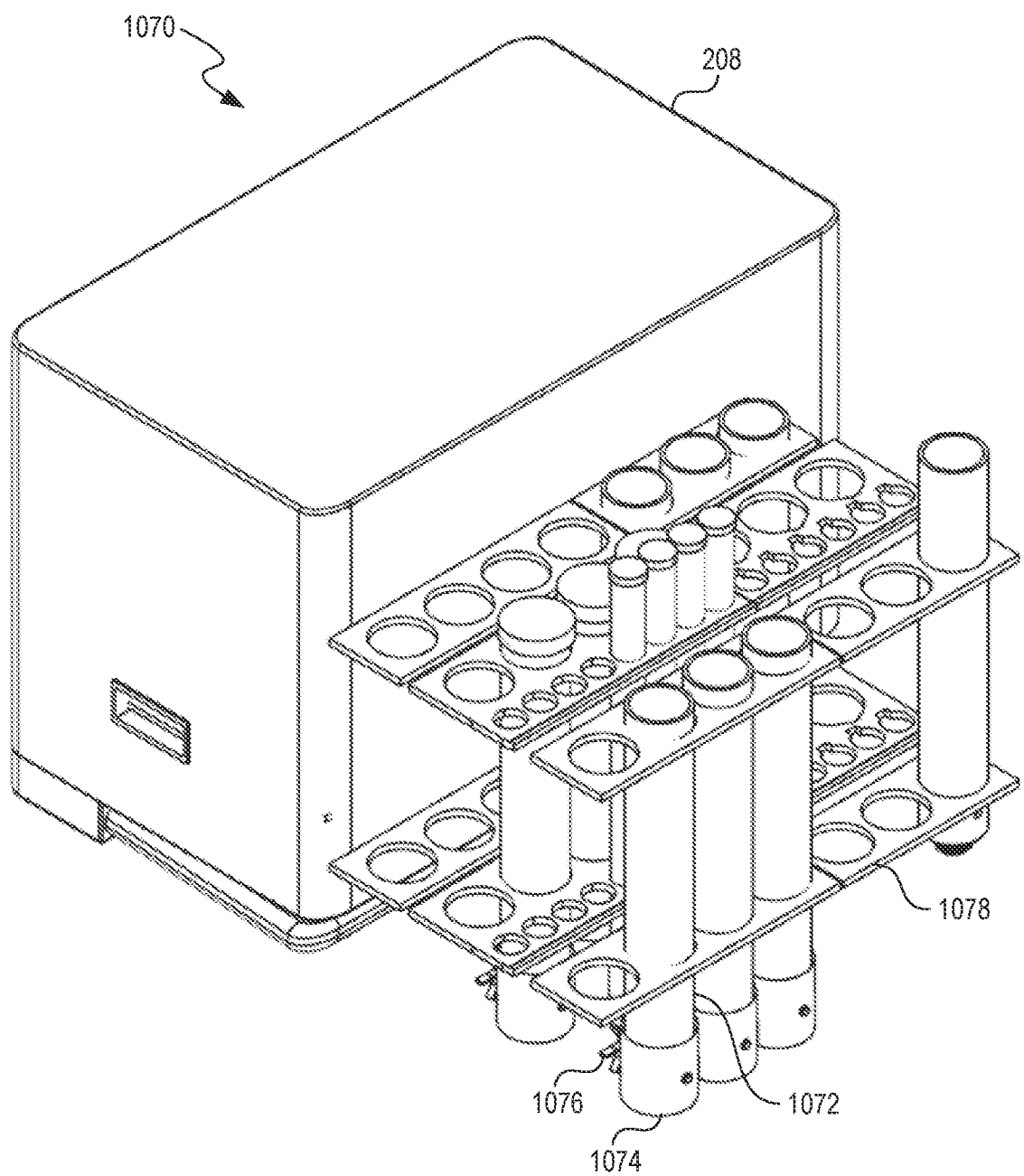
FIG. 10E is a drawing illustrating a perspective view of an ingredient storage subsystem, in accordance with some embodiments.

FIG. 10D is a drawing illustrating a perspective view of a gantry subsystem 1060, in accordance with some embodiments. In some embodiments, for example, as illustrated and described in more detail with reference to FIG. 2, a gantry subsystem includes two separate gantries: a first gantry for upper unit 220 and a second gantry for the lower unit 224. Gantry subsystem 1060 is controlled using components of the example computer system 1400 illustrated and described in more detail with reference to FIG. 14. Likewise, embodiments of gantry subsystem 1060 can include different and/or additional components or be connected in different ways.

In some embodiments, gantry subsystem 1060 includes two z-motors 1048, each mounted at an end of a separate fourth elongate member 1042. The fourth elongate member 1042 is oriented to have its long dimension along the z-axis as illustrated and described in more detail with reference to FIG. 10C. Gantry subsystem 1060 can include a y-motor 1044 for driving motion along the y-axis (see FIG. 10C). The y-motor 1044 is mounted at the end of first elongate member 1038. Motion along the x-axis is driven by x-motor 1046 mounted at the end of second elongate member 1032.

FIG. 10E is a drawing illustrating a perspective view of an ingredient storage subsystem 1070, in accordance with some embodiments. Another example ingredient storage subsystem 800 is illustrated and described in more detail with reference to FIG. 8. In the illustrated embodiments, the ingredient storage subsystem 1070 includes refrigerator 208 for storing perishable ingredients, and a number of tubular ingredient containers 1072. Likewise, embodiments of ingredient storage subsystem 1070 can include different and/or additional components or be connected in different ways.

Refrigerator 208 is illustrated and described in more detail with reference to FIG. 2. The ingredient containers 1072 are similar to the non-refrigerated food-grade containers 216 shown by FIG. 2. The ingredient containers 1072 store food ingredients sealed from outer elements. While a position of each container is fixed with respect to the axes 1036 (such that the gantry can readily be programmed to locate a container), the ingredients in each container can be swapped or changed.

In some embodiments, non-perishable ingredients within an ingredient storage subsystem (for example as in FIG. 2) are moved horizontally in parallel to kitchen countertop 232 within each of the food-grade containers for dispensing non-perishable ingredients. In some embodiments as shown by FIG. 10E, ingredients within ingredient storage subsystem 1070 are moved vertically and perpendicular to kitchen countertop 232 within the food-grade containers 1072 for dispensing ingredients.

The tubular ingredient containers 1072 can contain various types of ingredients, including dry ingredients, condiments, creams, pastes, liquids, seeds, and powders. Individual ingredient containers 1072 or groups of ingredient containers can be specially designed to hold a particular type of ingredient, such as a paste, cream, dried goods (e.g., rice or beans), liquid sauce, or leaves. In some embodiments, spindle 1076 is rotatable by an engager device (e.g., engager device 1034 shown by FIG. 10C) and configured to dispense at least one of grains, legumes, or leaves from a first one of food-grade containers 808 (see FIG. 8) or 1072. For example, each of the tubular ingredient containers 1072 has a dispenser or dispensing mechanism 1074 located at an end, which can be actuated by an appropriate mechanism (e.g., spindle 1076 or other similar and/or suitable mechanism). Grains, legumes and leaves can be dispensed using a revolving silicone spindle.

In some embodiments, a peristaltic pump (e.g., similar to peristaltic pump 504 shown by FIG. 5) is rotatable by an engager device (similar to engager device 1034) and configured to dispense creamy ingredients from a second one of food-grade containers 808 or 1072. For example, liquids are dispensed using a peristaltic pump. The peristaltic pump is operable by an engager device operated by the motor V 1052 (illustrated and described in more detail with reference to FIG. 10C), which is connected to a moving gantry. In some embodiments, a robotic system includes a tensioned lever operable by an engager device and configured to dispense liquid ingredients from a third one of food-grade containers 808 or 1072. For example, runny sauces are dispensed using the tensioned lever. Certain ingredients are dispensed using funnel 812 (see description in reference to FIG. 8) and/or one or more stainless steel straws.

In some embodiments, tubular ingredient containers 1072 are supported and/or are held in place by a number of flat brackets 1078 that contain holes sized to fit the outer diameters of the tubular ingredient containers 1072. The flat brackets 1078 can be made of steel, aluminum, iron, etc., and can be machined. Brackets 1078 enable tubular ingredient containers 1072, ingredient storage subsystem 1070, and at least a portion of robotic system 200 to be seamlessly embedded within kitchen cabinet 236. For example, brackets 1078 provide shelving and stability for food containers 1072 to be inserted and affixed, as well as to the entire system 200 including the gantry subsystem 1030 and electronics (the control subsystem 1200 (illustrated and described in more detail with reference to FIG. 12). Brackets 1078 thus enable at least a portion of robotic system 200 to be seamlessly affixed to the interior of kitchen cabinet 236 or a pharmacy cabinet or wall.

In some embodiments, a robotic system includes a hopper operable by an engager device of a gantry. The hopper is configured to dispense separable solid ingredients from a fourth one of food-grade containers 808 or 1072. For example, ingredient storage subsystem 1070 includes a "hopper," i.e., a dispensing mechanism for single-serving ingredients, such as burger patties or bread slices. In at least some embodiments, the ingredients storage subsystem 1070 includes a food grade container dispensing add-on mechanism for perishable chunky, moist items, and/or leafy grains. The add-on mechanism dispenses perishable chunky, moist items, and leafy grains from the food container.

Figure 10F:
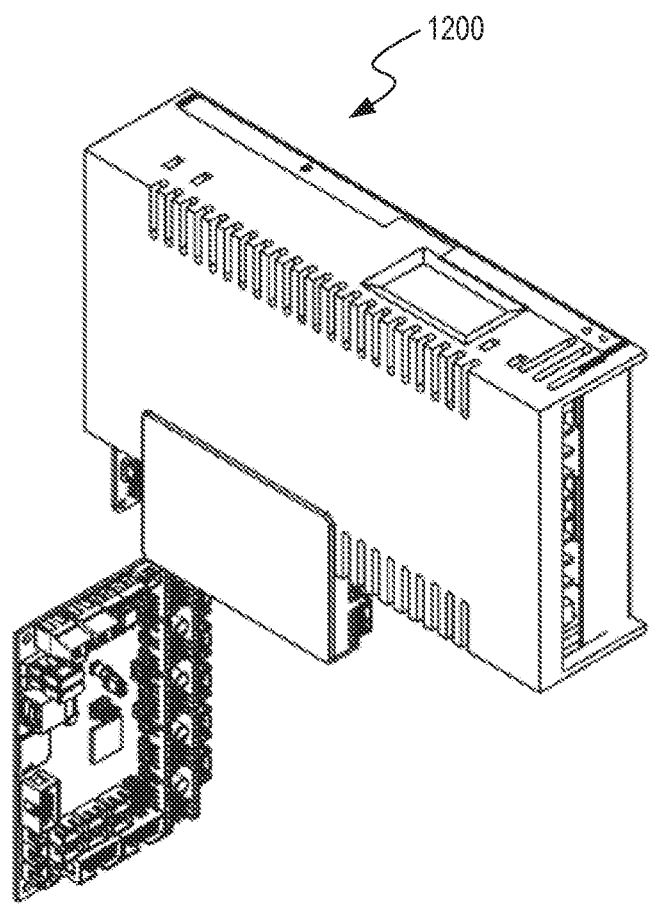
FIG. 10F is a drawing illustrating a perspective view of a control subsystem, in accordance with some embodiments.

FIG. 10F is a drawing illustrating a perspective view of a control subsystem 1200, in accordance with some embodiments. Control subsystem 1200 is implemented using components of the example computer system 1400 illustrated and described in more detail with reference to FIG. 14. For example, a portion of control subsystem 1200 can be implemented on computer system 1400 using instructions 1408 programmed in main memory 1406 illustrated and described in more detail with reference to FIG. 14. Likewise, embodiments of control subsystem 1200 can include different and/or additional components or be connected in different ways.

The control subsystem 1200 controls the overall operation of robotic system 200 (see FIG. 2). The control subsystem 1200 includes electronics as well as software for controlling some or all functions of system 200 (certain functions may be hardwired). Flexible electrical cables (not shown) can connect the control subsystem 1200 two other components of system 200, such as sensors, motors, etc. The control subsystem 1200 can include various types of circuitry (not shown), including one or more microprocessors, microcontrollers, application-specific integrated circuits (ASICs), programmable logic devices (PLDs), memories, communications devices (e.g., Wi-Fi transceiver, Ethernet adapter, etc.), some or all of which may be contained within one or more housings and/or mounted on one or more printed circuit boards or other suitable carriers.

The memory or memories can be used for storage of software and data. The term "software" as used herein includes firmware, i.e., software stored in a nonvolatile memory. The data may include, for example, configuration data, user interfaces and cooking recipes. Some or all of the functionality of system 200 can be implemented in software, which can be stored in the one or more memories within the electronics described above. The memories can be any combination of volatile memory and/or nonvolatile memory. In particular, the memories can include one or more forms of random access memory (RAM), read-only memory (ROM), flash memory, magnetic storage, etc., any of which may be reprogrammable. The software can be implemented in the form of various functional modules, as described further with respect to FIG. 12.

Figure 10G:
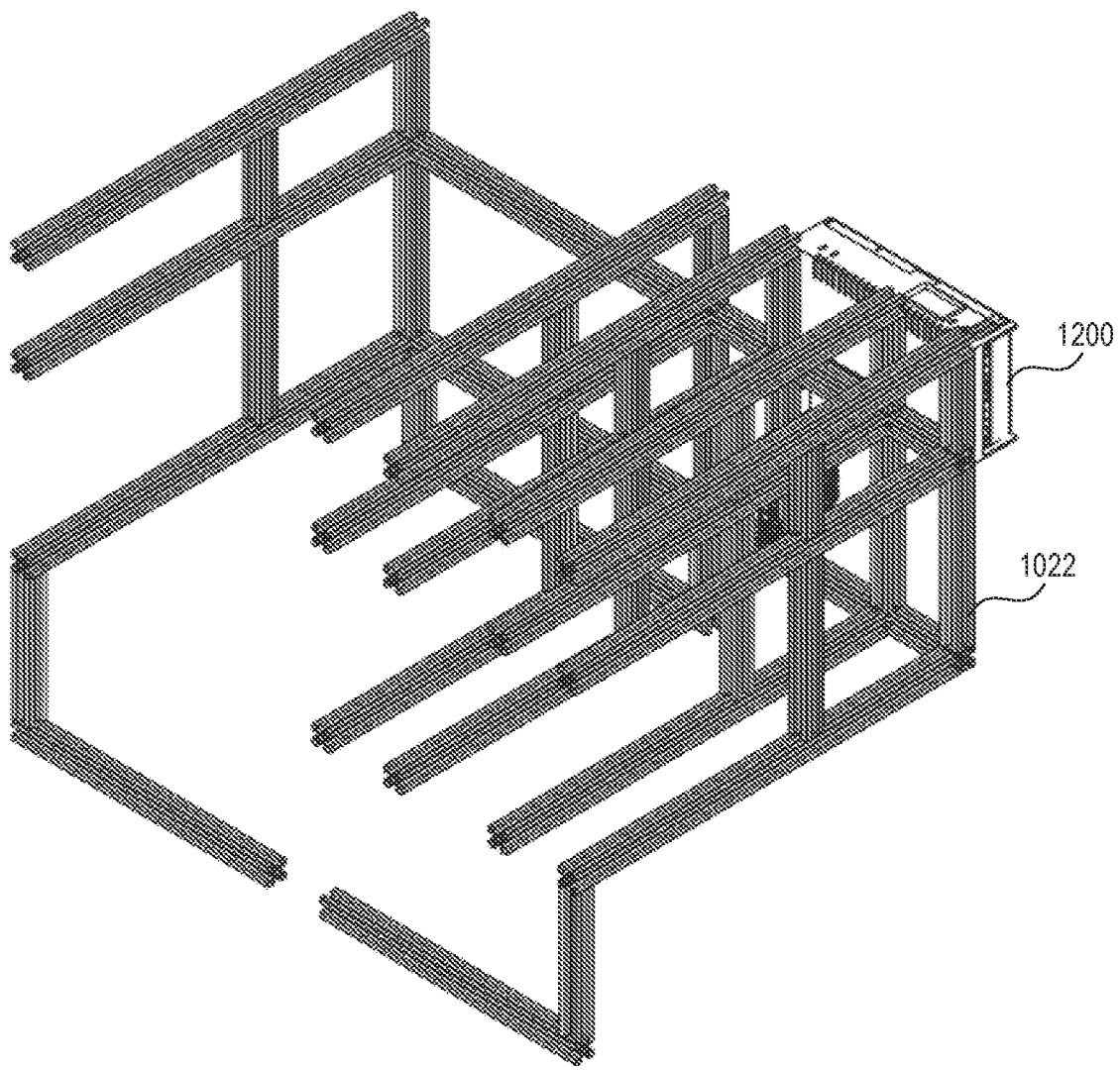
FIG. 10G is a drawing illustrating a perspective view of a metal framework, in accordance with some embodiments.

FIG. 10G is a drawing illustrating a perspective view of a metal framework, in accordance with some embodiments. The control subsystem 1200 (see FIG. 10F) can be mounted anywhere that is convenient, such as to the backside of the metal framework 1022 as shown in FIG. 10G (so that it is mostly or entirely hidden from the user's view when the entire system 200 (see FIG. 2) is installed).

Figure 11:
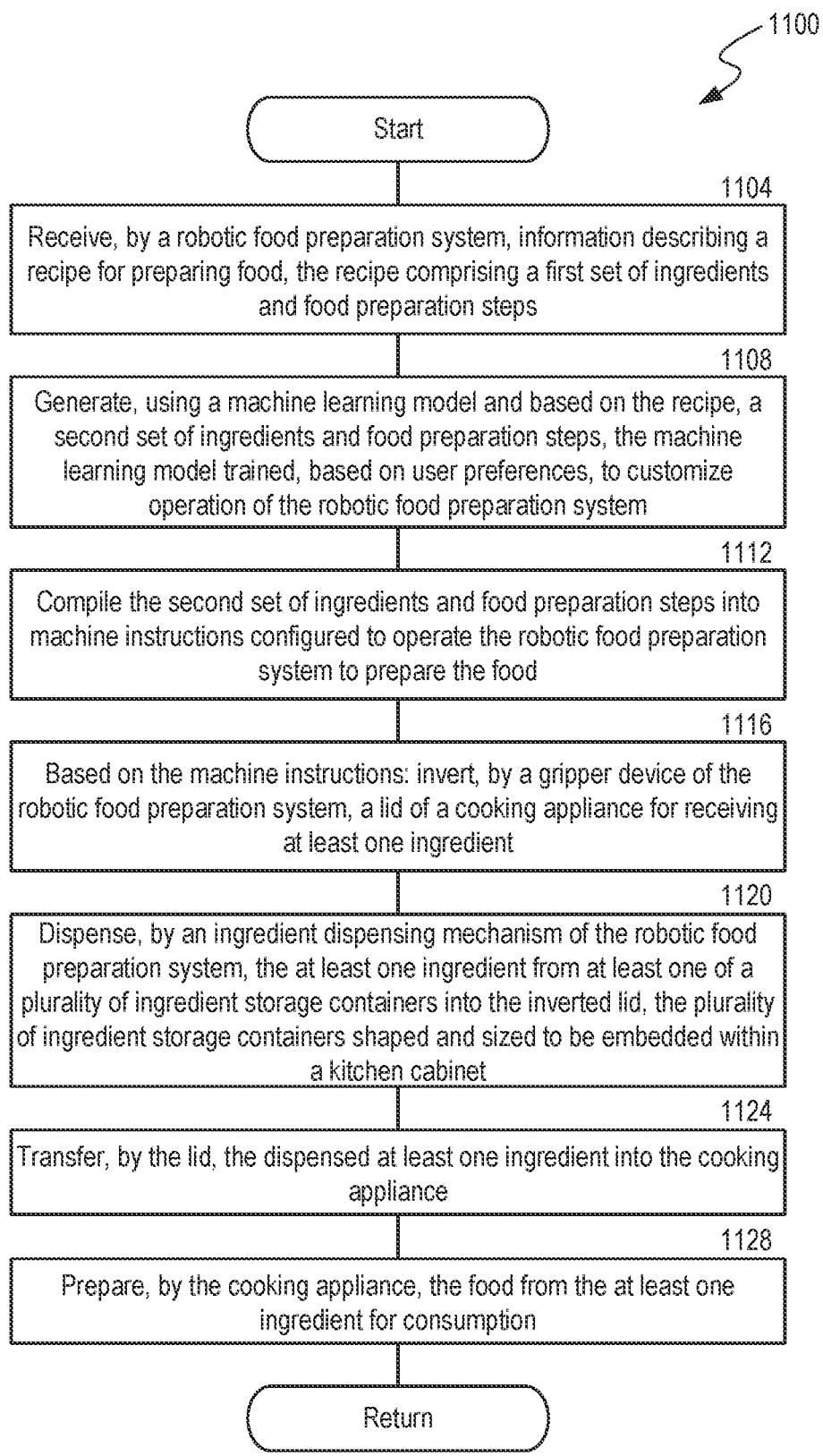
FIG. 11 is a flow diagram illustrating a computer-implemented process performed by a robotic system for food preparation, in accordance with some embodiments.

FIG. 11 is a flow diagram 1100 illustrating a computer-implemented process performed by a robotic system for food preparation, in accordance with some embodiments. In some implementations, process 1100 is performed by system 200 described in more detail with reference to FIG. 1. In some implementations, the process is performed by a computer system, e.g., the example computer system 1400 illustrated and described in more detail with reference to FIG. 14. Particular entities, for example, gantry subsystem 1030, gripper device 308, engager device 1034, a robotic arm, an ingredient storage subsystem, an ingredient dispenser, an ingredient dispensing mechanism, a sensor subsystem, a camera, a temperature sensor, a weight sensor, cooking appliance 108, or control subsystem 1200 perform some or all of the steps of process 1100 in other implementations. An example ingredient storage subsystem 800 is illustrated and described in more detail with reference to FIG. 8. Likewise, implementations can include different and/or additional steps or can perform the steps in different orders.

In step 1104, a robotic food preparation system receives information describing a recipe for preparing food. The information can include text, images, videos, screenshots, websites, an audio file, etc. The recipe includes a first set of ingredients and food preparation steps. For example, the ingredients include a cup of whole milk, two cups of all-purpose flour, two teaspoons of seasoned salt freshly ground black pepper, three quarters of a teaspoon of paprika, and a quarter teaspoon of cayenne pepper. The food preparation steps can include (1) heating the milk, (2) mixing the flour with the seasoned salt, black pepper, paprika, and cayenne pepper, and (3) heating oil in a cooking appliance 108 (see FIG. 2).

In some implementations, the information comprises a video. A machine learning model is used to generate, from the video, a description of the recipe. An example ML model 1316 is illustrated and described in more detail with reference to FIG. 13. The video (e.g., of a cooking show) is scanned and converted by the ML model into the description of the recipe. The description is usable by the robotic food preparation system to generate a second set of ingredients and food preparation steps.

In step 1108, the robotic food preparation system generates, using a machine learning model and from the recipe, a second set of ingredients and food preparation steps. The machine learning model can be trained, based on user preferences, to customize operation of the robotic food preparation system. Example ML training methods are described in more detail with reference to FIG. 13. The second set of ingredients and food preparation steps is a customized version of the first set of ingredients and food preparation steps based on user preferences, available ingredients, health concerns, etc.

In some implementations, the robotic system receives, via a user interface, at least one user preference. The robotic system (e.g., using the ML model) generates a user preference model customized to a user. The machine learning model is trained, based on the user preference(s), the first set of ingredients, and the second set of ingredients, to customize operation of the robotic food preparation system.

In step 1112, the robotic food preparation system compiles the second set of ingredients and food preparation steps into machine instructions configured to operate the robotic food preparation system to prepare the food. The second set of ingredients and food preparation steps are compiled using a translator that generates the machine instructions. In some implementations, the machine instructions include a sequence of simple computer instructions, with each instruction expressed as a string of binary digits or bits (i.e., 1's and 0's). The size of machine instructions can be varied for improved efficiency, e.g., 32-bit instructions or 64-bit instructions. Examples of recipes, food preparation steps, and computer instructions are provided in more detail with reference to FIG. 12.

In step 1116, based on the machine instructions: the robotic food preparation system inverts, by a gripper device of the robotic food preparation system, a lid of a cooking appliance for receiving at least one ingredient. An example gripper device 308 is shown by FIG. 3. An example lid 120 and example cooking appliance 108 are shown by FIG. 2. The ingredient intended to be received can be two cups of all-purpose flour. In some embodiments, the robotic food preparation system receives, via at least one sensor, sensor data describing the multiple ingredient storage containers. Based on the sensor data, an inventory of the ingredient(s) is determined.

In step 1120, based on the machine instructions: the robotic food preparation system dispenses, by an ingredient dispensing mechanism of the robotic food preparation system, the ingredient(s). Example dispensing mechanisms are described in more detail with reference to FIGS. 10A-C. The one or more ingredients are dispensed from at least one of multiple ingredient storage containers into the inverted lid. Example ingredient storage containers 808 are shown by FIG. 8. The multiple ingredient storage containers are shaped and sized to be embedded within a kitchen cabinet. An example kitchen cabinet 236 is shown by FIG. 2. The remaining ingredients for the food are dispensed in a similar manner.

In step 1124, based on the machine instructions: the robotic food preparation system transfers, by the lid, the dispensed at least one ingredient into the cooking appliance. The contents of the lid are transferred by right-ending the lid, by the gripper 308, and pouring out the ingredient into the cooking appliance. The remaining ingredients for the food are transferred in a similar manner.

In some embodiments, the robotic system receives, via a camera, at least one image of an area proximate to the robotic food preparation system. Based on the image(s) and using computer vision, the system determines that a portion of the food was spilled from the cooking appliance or an amount of the ingredient(s) was spilled from the ingredient dispensing mechanism. An alert is sent, via a user interface, associated with spilling of the portion of the food or the amount of the ingredient(s). For example, the alert is a text message, an e-mail, an audible alert or alarm, etc.

In step 1128, based on the machine instructions: the robotic food preparation system prepares, by the cooking appliance, the food from the ingredient(s) for consumption. In some implementations, after the food has been consumed, the robotic system receives, via a user interface, feedback describing the food. The user interface can be implemented using the components illustrated and described in more detail with reference to FIGS. 12 and 14. The robotic system incorporates the feedback into the user preferences to customize operation of the robotic food preparation system.

Figure 12:
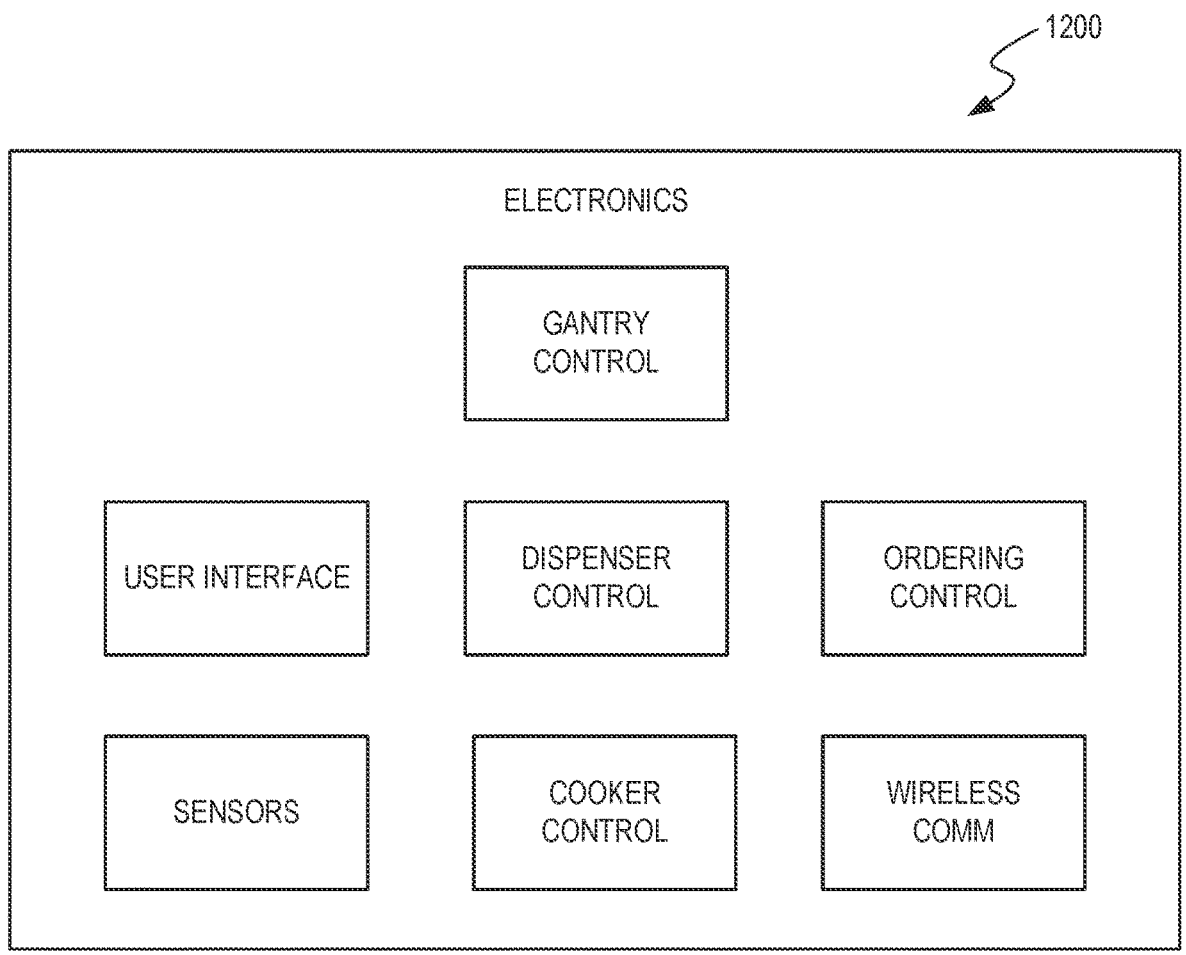
FIG. 12 is a block diagram illustrating a control subsystem of a robotic system for food preparation, in accordance with some embodiments.

FIG. 12 is a block diagram illustrating a control subsystem 1200 of a robotic system for food preparation, in accordance with some embodiments. The control subsystem 1200 (electronics of the robotic system 200 of FIG. 2) is implemented using components of the example computer system 1400 illustrated and described in more detail with reference to FIG. 14. For example, a portion of control subsystem 1200 can be implemented on computer system 1400 using instructions 1408 programmed in main memory 1406 illustrated and described in more detail with reference to FIG. 14. Likewise, embodiments of control subsystem 1200 can include different and/or additional components or be connected in different ways.

FIG. 12 shows the functional modules of the control subsystem 1200. Some of the functional modules may be implemented as software, though other functional modules may be implemented at least partially as hardware. As shown, the functional modules include a gantry control module, a dispenser control module, a cooker control module, a user interface module, various sensors, an ordering control module and a wireless communications module. The user interface module provides the functionality for all interaction with a human user of the system 200.

The sensors, as described herein, provide various inputs used to control or guide operation of the system, and may include one or more cameras, ingredient container fullness sensors, light sensors, temperature sensors mechanical end stops, etc. The gantry control module controls all of the movements of the gantry. The dispenser control module controls the end tools for dispensing ingredients from the container tubes. The cooker control module is used to control on/off functionality and temperature settings of each cooker. The ordering control module is used to control the ordering of ingredients, when needed (e.g., based on sensor inputs or user commands), via one or more networks. For example, the ordering control module may control the wireless communications module to communicate over a Wi-Fi network or other type of network with other intelligent home devices such as a smart speaker (e.g., Alexa), to cause such other devices to place orders for ingredients on online shopping sites. Alternatively, or additionally, the system 1 may have the ability to place such orders itself via the Internet. The wireless communications module controls the communications device(s) of the electronics (e.g., a Wi-Fi transceiver) to implement ingredient ordering functionality, communication with the user's devices (e.g., smart phone, tablet computer, notebook computer, desktop computer), etc.

In at least some embodiments, the electronics of the system 200 include a refrigeration module (a compressor, cooling system, etc.), which is embedded within a refrigerating insulation container. The refrigeration module refrigerates the perishable ingredients. The electronics of the system 200 can include WiFi-enabled smart plugs/outlets. The WiFi-enabled smart plugs/outlets are used by the SBC 488 to control the on/off of AC electrical appliances such as the cooking appliances 108. The WiFi-enabled smart plugs/outlets connect via WiFi the SBC to the AC electrical appliances.

In at least some embodiments, the electronics of the system 200 provides the user interface/interaction, communication for system 200. Parts of control subsystem 1200 can be implemented using Python™ as the main script running system 200 in real time. The Python™ code runs on SBC 488 and interacts with online, Wi-Fi-connected, or physically wired components. Some implementations use Java™ scrip to generate and operate native Android and iOS apps. The apps provide a visual user interface for user to select and customize recipes. Control subsystem 1200 can use OpenCV and MATLAB™ to provide computer vision software that analyzes system 200's visual and sensory data, and implement the functions described with reference to FIG. 11.

In some embodiments, control subsystem 1200 uses Node, js, and Python™ to generate Alexa™ functionality to implement a voice interface between system 200 and a user. System 200 can further implement HTML to generate Web content for a user interface to engage with new or existing customers. A user interface module provides the functionality for all interaction with a human user of robotic system 200. In at least some embodiments, system 200 is controlled by a user entirely via an application ("app") that runs on the user's smartphone, tablet computer, or other device, which communicates wirelessly with the control subsystem 1200. In at least some embodiments, system 200 has a built-in database of recipes; and users can add new recipes via the user interface to add each ingredient, its quantity and temporal placement in the recipe, along with any actions needed (mixing, sauteing, etc.). Software in the system 200 converts these inputs into Python lists readable by Python scripts, which then translate them into movements of the gantry system and end tools.

In at least one embodiment, to input a recipe into system 200, a user inputs recipe details into a table-like form in a graphical user interface (GUI), which can be provided by a mobile app for a smart phone, tablet or other similar or convenient device, or through a desktop software application. The order of ingredients and corresponding actions in the table corresponds to the order in which the ingredients will be dispensed and acted upon by the system 200. Accordingly, in such embodiments the user needs to input the ingredients and corresponding actions into the table in the order in which they are to be added during the food preparation process. The table below illustrates an example of such an interface with sample user-input data:

| Ingredient | Quantity | Units | Add to: | Action(s) |
|---|---|---|---|---|
| Cinnamon powder//etc. | {integer} | g/oz/cups/ Tb/ts | Bowl/Cooker/ Blender | Dispense only |
| Sweet potatoes | {integer} | g/oz/cups/ Tb/ts | Bowl/Cooker/ Blender | Dispense & mix Sauté |
| [Etc.] | ... | ... | ... | ... |

Once the user submits the data, software in the app and/or in the control subsystem converts the input data into a file (e.g., a Python list) that specifies the necessary movements of the gantry, retaining the order of actions as specified in the user input form. The manner in which the file is used is described further below in connection with the food preparation process. The file is stored in nonvolatile memory in the system 200. The following example shows how a recipe can be converted from the user interface form into a file usable by the system 200. In this example, the recipe is for caramelized onion. The following is an example of the information for the recipe as input by a user:

Recipe Title: Caramelized Onion
Servings: 2

| Ingredient | Quantity | Units | Add to: | Action(s) | Time |
|---|---|---|---|---|---|
| Olive oil | 10 | Grams | Cooker | Medium Heat | 4 Minutes |
| Diced onion | 30 | Grams | Cooker | Stir | 2 Minutes |

The following is an example of a Python file to which the software of the system converts the above data:

```
'Caramelized Onion' : {
    'diced onion' : 30,
    'olive oil' : 10,
    'destin' : 'cooker',
    'prep_t' : 6,        # t in min takes to prepare
    'servings' : 2
},
```

Once the recipe is in the system, the user can use the app to order the recipe to be made, by selecting the recipe by name along with the desired number of servings and the scheduled time for the food to be ready, for example as follows:

Select recipe: Caramelized Onion
Servings: 4
Schedule date & time: June 17, 12:00 pm The code then looks up the recipe by name, finds it, and in this example, starts making it at 11:54 am (because it is a 6-minute recipe). In at least some embodiments, cooking appliances 108 (see FIG. 2) are contained within a countertop box. The cooking appliances 108 can include rice cookers to cook or bake according to the recipe. Cooking appliances 108 are controlled by SBC 488 via the Wi-Fi-enabled smart plugs/outlets. Cooking appliances 108 can include a blender to blend the ingredients to produce a final (e.g., a smoothie) or intermediary recipe (e.g., a sauce).

In at least some embodiments, the process of food preparation generally is as follows. System 200 accesses and reads a gantry file for the selected recipe. In particular, the system 200 looks up an ingredient in the gantry file corresponding to the selected recipe. Each ingredient has been previously associated in the system 200 (e.g., by the user or the manufacturer of the system) with a particular set of (x,y,z) coordinates representing where the ingredient is stored in the system 200 (e.g., the coordinates of the dispenser end of the appropriate container tube 808 (see FIG. 8 for that ingredient). The gantry uses its lid gripper tool 308 to pick up and invert the lid 120 of the cooker 108 into which that ingredient will eventually be placed. The lid 120 of each cooker 108, when inverted, also functions as a bowl for measuring and/or combining of ingredients. Gantry subsystem 1030 (see FIG. 10C) then aligns the inverted lid 120 under the appropriate container 108 and dispenses the ingredient into the inverted lid 120. The mechanism of dispensing depends on the ingredient, as described above. Gantry subsystem 1030 can use its engager device 1034 (see FIG. 10C) to manipulate the dispenser (e.g., spindle) 1076 of a container tube, so that the dispensed ingredient falls into the inverted lid 120.

During the dispensing process, the gantry can use a scale to weigh the ingredient, if required. If the amount of the dispensed ingredient is less than the desired amount (as specified in the recipe), the system 200 repeats the dispensing action until the desired amount has been dispensed. If additional ingredients are to be mixed with the ingredient that was just dispensed, the process repeats with the next ingredient. Mixing can be achieved or facilitated by use of a separate mixing tool, blender, or by moving the lid 120 around.

The gantry carries the inverted lid 120 containing the ingredient or multiple combined ingredients (whichever is appropriate according to the receipt) back to its corresponding cooker 108 and turns the lid right-side-up to dump the contents into the cooker 108. The gantry sets the lid 120 down to cover the cooker 108. To turn on the cooker 108, the control subsystem 1200 actuates a solenoid within the countertop box. This can also occur prior to putting the ingredients into the cooker 108, such as if preheating is required.

Figure 13:
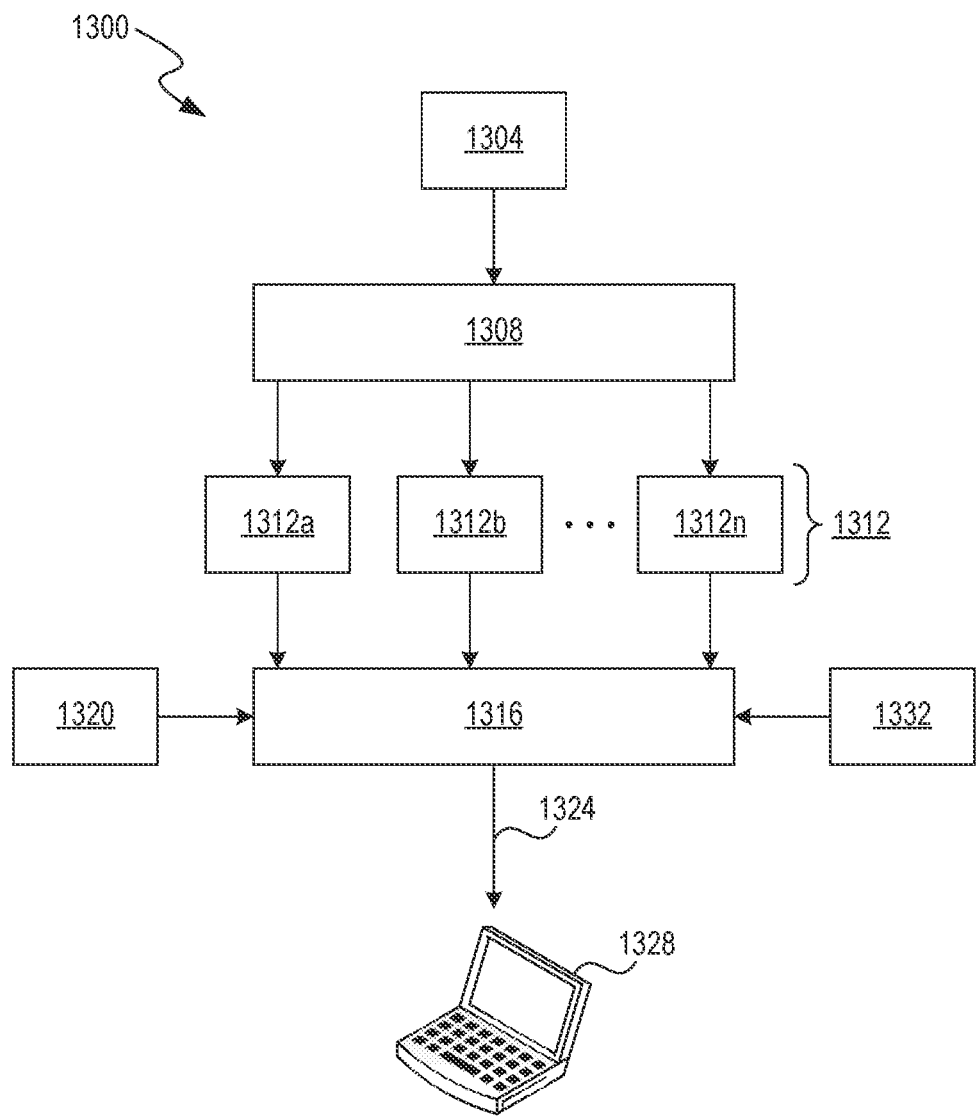
FIG. 13 is a block diagram illustrating an example machine learning (ML) system, in accordance with some embodiments.

FIG. 13 is a block diagram illustrating an example machine learning (ML) system 1300, in accordance with some embodiments. The ML system 1300 is implemented using components of the example computer system 1400 illustrated and described in more detail with reference to FIG. 13. For example, the ML system 1300 can be implemented on the computer system 1400 using instructions 1408 programmed in the main memory 1406 illustrated and described in more detail with reference to FIG. 14. Likewise, embodiments of the ML system 1300 can include different and/or additional components or be connected in different ways. The ML system 1300 is sometimes referred to as a ML module.

The ML system 1300 includes a feature extraction module 1308 implemented using components of the example computer system 1400 illustrated and described in more detail with reference to FIG. 11A. In some embodiments, the feature extraction module 1308 extracts a feature vector 1312 from input data 1304. The feature vector 1312 includes features 1312$a$, 1312$b$, ..., 1312$n$. The feature extraction module 1308 reduces the redundancy in the input data 04, e.g., repetitive data values, to transform the input data 1304 into the reduced set of features such as feature vector 1312, e.g., features 1312$a$, 1312$b$, ..., 1312$n$. The feature vector 1312 contains the relevant information from the input data 1304, such that events or data value thresholds of interest can be identified by the ML model 1316 by using this reduced representation. In some example embodiments, the following dimensionality reduction techniques are used by the feature extraction module 1308: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the ML model 1316 performs deep learning (also known as deep structured learning or hierarchical learning) directly on the input data 1304 to learn data representations, as opposed to using task-specific algorithms. In deep learning, no explicit feature extraction is performed; the features of feature vector 1312 are implicitly extracted by the ML system 1300. For example, the ML model 1316 can use a cascade of multiple layers of nonlinear processing units for implicit feature extraction and transformation. Each successive layer uses the output from the previous layer as input. The ML model 1316 can thus learn in supervised (e.g., classification) and/or unsupervised (e.g., pattern analysis) modes. The ML model 1316 can learn multiple levels of representations that correspond to different levels of abstraction, wherein the different levels form a hierarchy of concepts. In this manner, the ML model 1316 can be configured to differentiate features of interest from background features.

In one example, the ML model 1316, e.g., in the form of a CNN generates the output 1324, without the need for feature extraction, directly from the input data 1304. In some examples, the output 1324 is provided to the computer device 1328 or video display 1418. The computer device 1328 is a server, computer, tablet, smartphone, smart speaker, etc., implemented using components of the example computer system 1400 illustrated and described in more detail with reference to FIG. 14. In some embodiments, the steps performed by the ML system 1300 are stored in memory on the computer device 1328 for execution.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 1316 can be a CNN that includes both convolutional layers and max pooling layers. The architecture of the ML model 1316 can be "fully convolutional," which means that variable sized sensor data vectors can be fed into it. For all convolutional layers, the ML model 1316 can specify a kernel size, a stride of the convolution, and an amount of zero padding applied to the input of that layer. For the pooling layers, the ML model 1316 can specify the kernel size and stride of the pooling.

In some embodiments, the ML system 1300 trains the ML model 1316, based on the training data 1320, to correlate the feature vector 1312 to expected outputs in the training data 1320. As part of the training of the ML model 1316, the ML system 1300 forms a training set of features and training labels by identifying a positive training set of features that have been determined to have a desired property in question, and, in some embodiments, forms a negative training set of features that lack the property in question.

The ML system 1300 applies ML techniques to train the ML model 1316, that when applied to the feature vector 1312, outputs indications of whether the feature vector 1312 has an associated desired property or properties, such as a probability that the feature vector 1312 has a particular Boolean property, or an estimated value of a scalar property. The ML system 1300 can further apply dimensionality reduction (e.g., via linear discriminant analysis (LDA), PCA, or the like) to reduce the amount of data in the feature vector 1312 to a smaller, more representative set of data.

The ML system 1300 can use supervised ML to train the ML model 1316, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 1332 is formed of additional features, other than those in the training data 1320, which have already been determined to have or to lack the property in question. The ML system 1300 applies the trained ML model (e.g., ML model 1316) to the features of the validation set 1332 to quantify the accuracy of the ML model 1316. Common metrics applied in accuracy measurement include: Precision and Recall, where Precision refers to a number of results the ML model 1316 correctly predicted out of the total it predicted, and Recall is a number of results the ML model 1316 correctly predicted out of the total number of features that had the desired property in question. In some embodiments, the ML system 1300 iteratively re-trains the ML model 1316 until the occurrence of a stopping condition, such as the accuracy measurement indication that the ML model 1316 is sufficiently accurate, or a number of training rounds having taken place. The validation set 1332 can include data corresponding to confirmed environmental features, object motion, ingredient data, recipe data, user preferences, any other type of training set, or combinations thereof. This allows the detected values to be validated using the validation set 1332. The validation set 1332 can be generated based on analysis to be performed.

In some embodiments, ML system 1300 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised machine learning to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Figure 14:
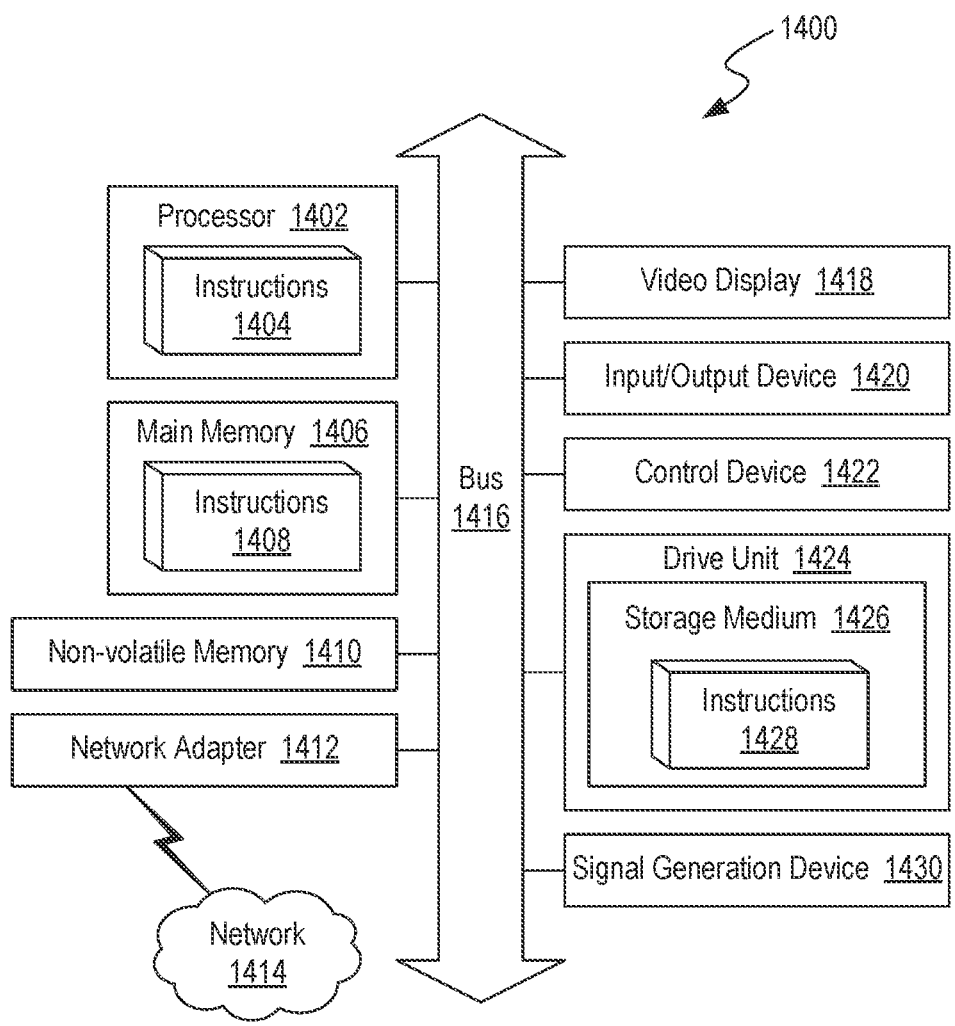
FIG. 14 is a block diagram illustrating an example computer system, in accordance with some embodiments.

FIG. 14 is a block diagram illustrating an example computer system 1400, in accordance with some embodiments. In some embodiments, components of the example computer system 1400 are used to implement the robotic system 200 or the ML system 1300 illustrated and described in more detail with reference to FIGS. 2 and 13. At least some operations described herein can be implemented on the computer system 1400.

The computer system 1400 can include one or more central processing units ("processors") such as one or more processors 1402, and can further include main memory 1406, non-volatile memory 1410, network adapter 1412 (e.g., network interface), video displays 1418, input/output devices 1420, control devices 1422 (e.g., keyboard and pointing devices), drive units 1424 including a storage medium 1426, and a signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1400 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the computer system 1400.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1404, 1408, 1428) set at various times in various memory and storage devices in a computer device. When read and executed by the one or more processors 1402, the instruction(s) cause the computer system 1400 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and/or non-volatile memory 1410, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1412 enables the computer system 1400 to mediate data in a network 1414 with an entity that is external to the computer system 1400 through any communication protocol supported by the computer system 1400 and the external entity. The network adapter 1412 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1412 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art. Although the embodiments are described herein with reference to the preferred embodiment, one skilled in the art will readily appreciate that other applications may be substituted for those set forth herein without departing from the spirit and scope of the embodiments.

I claim:

1. A robotic system for food preparation, wherein at least a portion of the robotic system is shaped and sized to be embedded within a kitchen cabinet, the robotic system comprising:
    a gantry subsystem comprising a robotic arm mechanically coupled to a gripper device and an engager device, wherein the gantry subsystem is configured to translate and rotate each of the robotic arm, the gripper device, and the engager device relative to orthogonal axes;
    an ingredient storage subsystem mechanically coupled to the gantry subsystem and comprising a plurality of ingredient storage containers, wherein each ingredient storage container has an ingredient dispenser actuatable by an ingredient dispensing mechanism operable by the engager device to dispense ingredients;
    a sensor subsystem comprising at least one of a camera, a temperature sensor, or a weight sensor;
    a cooking appliance positioned below the ingredient storage subsystem and having a lid operable by the gripper device, the lid configured to
    weigh the dispensed ingredients; and
    transfer the dispensed ingredients into the cooking appliance, the cooking appliance configured to convert the ingredients into the food; and
    a control subsystem communicably coupled to the sensor subsystem and the gantry subsystem, the control subsystem configured to:
    receive information describing a recipe;
    compile the information into machine instructions configured to operate the robotic system for performing the food preparation.

2. The robotic system of claim 1, wherein the kitchen cabinet is a first kitchen cabinet, and
    wherein the gantry subsystem comprises:
        a first gantry configured to:
            reside within the first kitchen cabinet; and
            operate the engager device to dispense the ingredients; and
        a second gantry configured to:
            reside within a second kitchen cabinet; and
            position the cooking appliance relative to the ingredient dispenser for the cooking appliance to receive the dispensed ingredients.

3. The robotic system of claim 1, comprising:
a metal framework comprising a plurality of elongate aluminum extrusions configured to:
  support the at least the portion of the robotic system; and
  mount the at least the portion of the robotic system to inner walls of the kitchen cabinet.

4. The robotic system of claim 1, comprising:
at least one drag belt configured to house a wire, cable, or tube of the robotic system to prevent coiling and entangling of the wire, cable, or tube.

5. The robotic system of claim 1, wherein the robotic arm comprises:
at least a first and a second elongate member,
  wherein the first elongate member is oriented along a first orthogonal axis and slidably mounted on the second elongate member,
  wherein the second elongate member is oriented along a second orthogonal axis, and
  wherein the first elongate member is movable in translation along the second orthogonal axis.

6. The robotic system of claim 5, wherein the gripper device or the engager device is slidably mounted on the first or second elongate member, and
  wherein the gripper device or the engager device is movable in translation along the first or second orthogonal axis.

7. The robotic system of claim 5, wherein each of the first and the second elongate member, the gripper device, and the engager device is movable in translation or rotation by one or more motors.

8. The robotic system of claim 1, wherein the plurality of ingredient storage containers comprises:
a refrigerated first plurality of food-grade containers configured to store perishable ingredients; and
a second plurality of food-grade containers configured to store non-perishable ingredients,
  wherein the robotic system comprises a refrigerator configured to contain the refrigerated first plurality of food-grade containers.

9. The robotic system of claim 8, comprising:
a Peltier device and a water block embedded within the kitchen cabinet and configured to cool the refrigerator.

10. The robotic system of claim 1, wherein the ingredient dispensing mechanism comprises a spindle rotatable by the engager device and configured to dispense at least one of grains, legumes, or leaves from at least one of the plurality of ingredient storage containers.

11. The robotic system of claim 1, wherein the ingredient dispensing mechanism comprises a peristaltic pump rotatable by the engager device and configured to dispense creamy ingredients from at least one of the plurality of ingredient storage containers.

12. The robotic system of claim 1, wherein the ingredient dispensing mechanism comprises a tensioned lever configured to dispense liquid ingredients from at least one of the plurality of ingredient storage containers.

13. The robotic system of claim 1, wherein the ingredient dispensing mechanism comprises a hopper configured to dispense separable solid ingredients from at least one of the plurality of ingredient storage containers.

14. The robotic system of claim 1, comprising:
a sucking device configured to:
  suck in a liquid prepared by the robotic system; and
  transfer the liquid into the cooking appliance for combining the liquid with a food item prepared by the robotic system.

* * * * *